US012109858B1

(12) United States Patent
Teicher

(10) Patent No.: US 12,109,858 B1
(45) Date of Patent: Oct. 8, 2024

(54) AUTONOMOUS VEHICLE FOR ROAD AND RAIL

(71) Applicant: Mordechai Teicher, Hod-Hasharon (IL)

(72) Inventor: Mordechai Teicher, Hod-Hasharon (IL)

(*) Notice: Subject to any disclaimer, the term of this patent is extended or adjusted under 35 U.S.C. 154(b) by 0 days.

(21) Appl. No.: 18/656,783

(22) Filed: May 7, 2024

Related U.S. Application Data

(63) Continuation-in-part of application No. 18/220,294, filed on Jul. 11, 2023, now Pat. No. 12,024,065.

(60) Provisional application No. 63/525,242, filed on Jul. 6, 2023.

(51) Int. Cl.

| | | |
|---|---|---|
| *B60F 1/04* | (2006.01) | |
| *B60L 7/14* | (2006.01) | |
| *B60L 7/18* | (2006.01) | |
| *B60L 15/00* | (2006.01) | |
| *B60L 15/20* | (2006.01) | |
| *B60L 15/30* | (2006.01) | |
| *B60L 50/60* | (2019.01) | |
| *B60L 53/10* | (2019.01) | |
| *B60Q 3/70* | (2017.01) | |
| *B61C 11/00* | (2006.01) | |
| *B61L 1/02* | (2006.01) | |

(52) U.S. Cl.
CPC ............... *B60F 1/043* (2013.01); *B60L 7/14* (2013.01); *B60L 7/18* (2013.01); *B60L 15/007* (2013.01); *B60L 15/2009* (2013.01); *B60L 15/30* (2013.01); *B60L 50/60* (2019.02); *B60L 53/10* (2019.02); *B60Q 3/731* (2022.05); *B61C 11/005* (2013.01); *B61L 1/02* (2013.01); *B60L 2200/26* (2013.01)

(58) Field of Classification Search
CPC .... B60F 1/043; B60L 7/14; B60L 7/18; B60L 15/007; B60L 15/2009; B60L 50/60; B60L 53/10; B60L 2200/26; B61C 11/005
USPC ..................................................... 701/22, 19
See application file for complete search history.

(56) References Cited

U.S. PATENT DOCUMENTS

| | | | |
|---|---|---|---|
| 5,111,127 | A | 5/1992 | Johnson |
| 5,559,420 | A | 9/1996 | Kohchi |
| 7,795,837 | B1 | 9/2010 | Haun |
| 8,627,908 | B2 | 1/2014 | Wellborn |
| 10,040,370 | B2 | 8/2018 | Wei |
| 10,618,537 | B2 | 4/2020 | Khosla |
| 10,836,413 | B2 | 11/2020 | Da Costa |

(Continued)

FOREIGN PATENT DOCUMENTS

| | | |
|---|---|---|
| JP | 6498949 B2 | 4/2019 |
| WO | 2019181301 A1 | 9/2019 |

OTHER PUBLICATIONS

Machine translation of Ishikawa et al. JP6498949 (Year: 2019).

(Continued)

*Primary Examiner* — Jacob S. Scott
*Assistant Examiner* — Michael E Butler

(57) ABSTRACT

An autonomous electric road vehicle is transported by a railcar for automated railed travel on a railway. During automated railed travel, the railcar is powered by the autonomous road vehicle's main power source and driven by the autonomous road vehicle's driving automation control system. A driver control of the autonomous electric road vehicle allows a human driver to apply emergency braking during both road and railed travel.

18 Claims, 15 Drawing Sheets

(56) References Cited

U.S. PATENT DOCUMENTS

| | | | |
|---|---|---|---|
| 11,021,178 B2 | 6/2021 | Ghaly | |
| 2011/0017094 A1* | 1/2011 | Cencer | B61D 3/18 |
| | | | 14/69.5 |
| 2013/0204455 A1 | 8/2013 | Chia | |
| 2014/0217991 A1 | 8/2014 | Wisniewski | |
| 2014/0375272 A1 | 12/2014 | Johnsen | |
| 2015/0217656 A1 | 8/2015 | Loftus | |
| 2016/0023562 A1 | 1/2016 | Parra Ortiz | |
| 2018/0029618 A1* | 2/2018 | Huck | B60L 13/06 |
| 2019/0034857 A1* | 1/2019 | Ferguson | G05D 1/0038 |
| 2021/0284043 A1 | 9/2021 | Wang | |
| 2022/0234489 A1* | 7/2022 | Tam | B60P 3/007 |

OTHER PUBLICATIONS

Machine translation of Kazuhiko WO2019181301-A1 (Year: 2019).
Screenshots from Ferromobile website https://ferromobile.fr/en/ retrieved Sep. 23, 2023.
SAE International Taxonomy and Definitions J3016 revised Apr. 2021 https://www.sae.org/standards/content/j3016_202104/ retrieved Apr. 19, 2024.

* cited by examiner

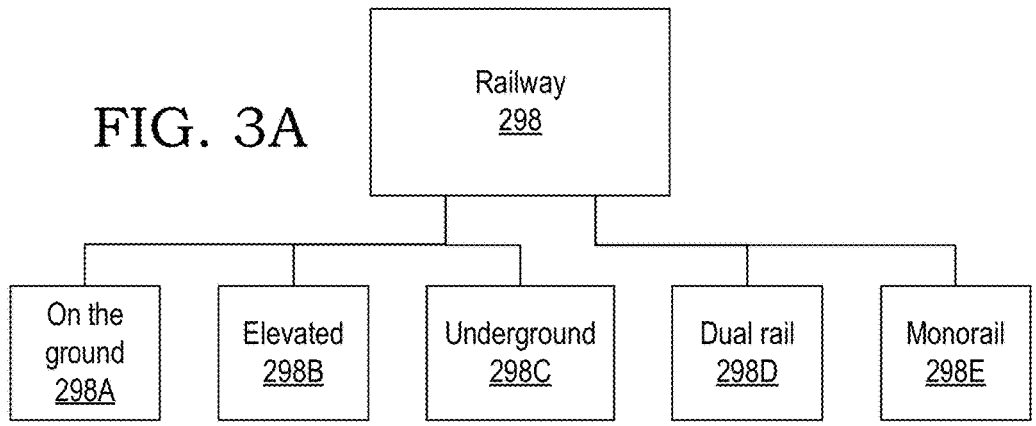
FIG. 3A
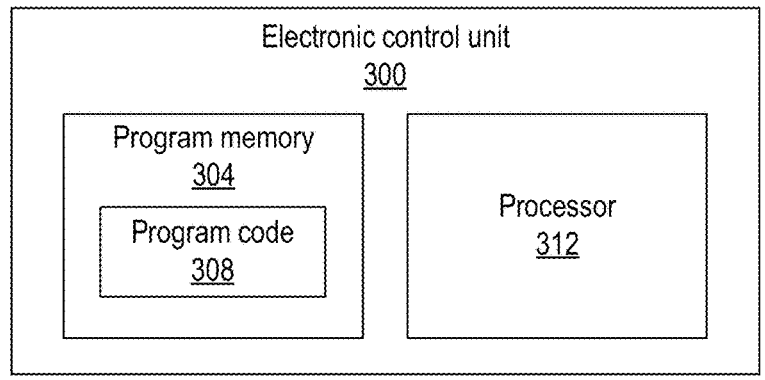
FIG. 3B
FIG. 3C

AUTONOMOUS VEHICLE FOR ROAD AND RAIL

REFERENCE TO RELATED APPLICATIONS

This application is a continuation-in-part of U.S. patent application Ser. No. 18/220,294 filed on 11 Jul. 2023, which is incorporated herein by reference in its entirety. U.S. patent application Ser. No. 18/220,294 claims the benefit of U.S. provisional patent application 63/525,242 filed on 6 Jul. 2023, and is incorporated herein by reference in its entirety.

BACKGROUND OF THE INVENTION

Field of the Invention

The present disclosure relates to autonomous vehicles, and in particular to autonomous electric vehicles.

Description of Related Art

Electric road vehicles, such as electric passenger cars or electric trucks, use a battery pack or fuel cell to power an electric motor that propels the vehicle.

In autonomous vehicles, sensors and electronic control units are harnessed to assist or replace a human driver in driving the vehicle.

Driving automation is commonly classified at levels 0-5 according to the widely accepted SAE J3016 classification by SAE International (Society of Automotive Engineers)—https://www.sae.org/standards/content/j3016_202104/, wherein level 0 is no driving automation while level 5 is full driving automation that allows driverless travel.

Railed travel, where vehicles move on rails that are separate from other traffic, highly reduces the complexity and safety risks of autonomous travel.

The present disclosure comes to combine the advantages of autonomous road travel and railed travel in a novel and useful manner.

SUMMARY OF THE INVENTION

Definitions

"Vehicle" herein is a wheeled motorized transportation instrument. "Electric vehicle" is a vehicle propelled by an electric motor.

"Road vehicle" travels on paved, gravel and dirt roads, while "motorized railcar", abbreviated "railcar", travels on rails.

"Railway" is a track made of metal rails.

"Driving automation control system" herein combines sensors and electronic control units to assist or replace a human driver in planning at least one of braking, accelerating, or steering of a vehicle. In case of a railcar, steering control is replaced herein by track switching control.

"Autonomous vehicle" herein is a vehicle that harnesses a driving automation control system to assist or replace a human driver in driving the vehicle. A vehicle that features just automated emergency braking or adaptive cruise control is considered herein autonomous vehicle. On the extreme end there is a "driverless vehicle" that is devised and authorized to travel with no human supervision.

"Automated traveling" or "automated driving" herein pertain to the operation of an autonomous vehicle while being driven or assisted by a driving automation control system.

"Vehicle-on-railcar", is a novel transportation concept taught by the present disclosure, of an autonomous electric road vehicle temporarily mounted on, powering and controlling a railcar.

"Electronic control unit (ECU)" is an embedded module in automotive electronics that controls one or more of the electrical systems or subsystems in a motor vehicle. An electronic control unit may include a plurality of electronic control units; for example, a driving control ECU may include an acceleration control ECU, a braking control ECU, and a steering control ECU.

"Electronic control system" is the collection of all electronic control units in a motor vehicle.

"Non-transitory computer-readable media" comprise all computer-readable media, with the exception of transitory, propagating signal.

Brief Summary

Highlights

The present disclosure suggests that the safest and most practical autonomous road vehicle is a vehicle-on-railcar—an autonomous electric road vehicle temporarily mounted on, powering and controlling an electric railcar. Railcars run on railways that may be separate from other traffic, and easily combine into platoons or trains that drive safely at high speed. Rail transport benefits from a huge supportive industry, installed infrastructure and regulatory basis, as well as from a plethora of proven technologies, components, safety standards, and public trust.

The present disclosure envisions main roads that are replaced or supplemented by railways dedicated to vehicle-on-railcar traffic. In an example scenario, a driver of an autonomous road vehicle conventionally (according to the vehicle and environment level of autonomy) drives "the first mile" from home to a nearby dedicated railway. The road vehicle is then mounted on and electrically and logically connected to a railcar for an autonomous railed cruise of the vehicle-on-railcar. Finally, the road vehicle disembarks from the railcar and resumes "the final mile" of conventional road travel toward the destination.

Since railed travel on dedicated rails that are separate from other traffic is simpler and safer than typical road travel, it is likely that a railed travel segment of the vehicle-on-railcar will afford a higher level of autonomy than a corresponding road segment, with an ultimate ideal of achieving autonomy level of driverless travel at as many railed travel segments as possible. Moreover, investment in a railed travel environment in a certain area may be made specifically for upgrading the autonomy level of vehicle-on-railcar travel in that area to driverless.

The present disclosure teaches powering the transporting railcar by electricity supplied by the transported autonomous road vehicle, which offers at least three important advantages: (1) eliminating the need to install, service and power fail-safe catenary electricity lines, thereby highly reducing the costs of a new infrastructure dedicated to vehicle-on-railcar traffic; (2) eliminating the cost and complexity of a pantograph per railcar; and (3) avoiding the consumption of additional electricity at peak hours, and instead using electricity charged at home by autonomous road vehicles at off-peak hours, typically overnight.

The present disclosure further teaches controlling the transporting railcar by the driving automation control system of the transported autonomous road vehicle. This way, the transporting railcar can be simple and of low cost, while the sophisticated automated driving functionalities are provided by an existing driving automation control system of the transported road vehicle, which is already paid for.

Unified Autonomous Vehicle-On-Railcar

The present disclosure teaches an autonomous road vehicle mounted on and transported by a motorized railcar that is powered and controlled by the transported road vehicle. During the railed travel, the road vehicle and railcar are effectively merged into a unified vehicle-on-railcar transportation instrument, wherein the road vehicle offers a safe and convenient accommodation for the driver and passengers and provides power and driving automation, while the railcar provides the simplicity and safety of railed travel.

The railway then turns into a kind-of single-lane road. Acceleration and braking on rail are similar by their nature and effect to their road counterparts with appropriate adjustments of friction and safety parameters, while steering is replaced by track switching for route selection. In summary, driving automation turns to be much simpler and safer for vehicle-on-railcar riding on sperate railways, than for the same road vehicle riding on the road. Furthermore, vehicle sensors that form part of the driving automation control system of the autonomous road vehicle, lend themselves to detect and perceive the environment of the vehicle-on-railcar travel, which is likely simpler and more predictable than the environment of a typical road travel.

All of the above suggest the extension of concepts and technologies of automated driving of an autonomous road vehicle on road, to automated driving of a vehicle-on-railcar on rails.

The concept of autonomous vehicle-on-railcar encourages extending also the concept of manual driver intervention in automated driving of a road vehicle on road, to manual driver intervention in automated driving of a vehicle-on-railcar on rail. For example, a human driver of an autonomous vehicle-on-railcar may depress the brake pedal of the road vehicle for emergency braking of the vehicle-on-railcar on rails, actually actuating friction brakes of the railcar.

Summary of Preferred Embodiments

According to preferred embodiments of the present invention, there is provided an autonomous road vehicle operable for both automated road travel and automated railed travel. During automated railed travel, the autonomous road vehicle is mounted on and transported by a railcar on a railway. The autonomous road vehicle may include a main power source operable to: (i) during automated road travel, electrically power a vehicle motor of the autonomous road vehicle, and (ii) during automated railed travel, electrically power a railcar motor of the railcar. The autonomous road vehicle may further include a vehicle power delivery connection operable to, during automated railed travel, deliver electric power from the autonomous road vehicle to the railcar to electrically power the railcar motor. The autonomous road vehicle may also include a driving automation control system operable to: (i) during automated road travel, autonomously control at least braking, and preferably also accelerating and/or steering, of the autonomous road vehicle, and (ii) during automated railed travel, autonomously control at least braking and preferably also accelerating and/or track switching, of the railcar.

The autonomous road vehicle may further include a vehicle inverter. During automated railed travel, the electric power delivered from the autonomous road vehicle to the railcar via the vehicle power delivery connection is variable frequency AC power supplied from the vehicle inverter to a railcar AC motor of the railcar. Acceleration of the railcar is controlled by the driving automation control system varying the variable frequency of the AC power. If the main power source of the autonomous road vehicle is a rechargeable battery pack, the vehicle power delivery connection may be further operable to momentarily deliver electric power from the railcar AC motor to the autonomous road vehicle, to charge the rechargeable battery pack upon regenerative braking of the railcar.

The autonomous road vehicle may further include a driver control that allows a human driver: (i) during automated road travel, to override the driving automation control system and manually apply emergency vehicle braking, and (ii) during automated railed travel, to override the driving automation control system and manually apply emergency railcar braking.

There is also provided a method for operating an autonomous road vehicle for automated travel of at least one road segment and at least one rail segment. The method includes, for automated travel of a road segment: electrically powering a vehicle motor of the autonomous road vehicle, and autonomously controlling, by a driving automation control system of the autonomous road vehicle, at least braking, and preferably also accelerating and/or steering, of the autonomous road vehicle. For automated travel of a rail segment, while the autonomous road vehicle is mounted on a railcar, the method includes delivering electric power from the autonomous road vehicle to the railcar to power a railcar motor of the railcar, and autonomously controlling, by the driving automation control system of the autonomous road vehicle, at least braking, and preferably also accelerating and/or track switching, of the railcar.

The method may further include, when the autonomous road vehicle includes a driver control: (i) during automated road travel, monitoring the driver control for conditionally overriding the driving automation control system and applying manual emergency vehicle braking, and (ii) during automated railed travel, monitoring the driver control for conditionally overriding the driving automation control system and applying manual emergency railcar braking.

The method may also include, toward traveling an automated rail segment: verifying in advance that a sufficient amount of electric power is allocated for powering the railcar through the automated rail segment, as a precondition for traveling the automated rail segment.

According to preferred embodiments of the present invention, there is also provided a system operable for automated road travel and automated railed travel of an autonomous road vehicle. The system may include a railcar operable to transport an autonomous road vehicle on a railway. The railcar may include a deck operable to support the autonomous road vehicle when mounted on the railcar for automated railed travel, a railcar motor, and railcar friction brakes. The system also includes an autonomous road vehicle having a vehicle motor, a main power source operable to: (i) during automated road travel, electrically power the vehicle motor, and (ii) during automated railed travel, electrically power the railcar motor. The autonomous road vehicle further includes a vehicle power delivery connection operable to, during automated railed travel, deliver electric power from the autonomous road vehicle to the railcar to electrically power the railcar motor. Also, the autonomous road vehicle includes a driving automation control system operable to: (i) during automated road travel, autonomously control at least braking, and preferably also accelerating and/or steering, of the autonomous road vehicle, and (ii) during automated railed travel, autonomously control at least braking, and preferably also accelerating and/or track switching, of the railcar. The system may further include a railcar driving control operable to control operation of the railcar motor and the railcar friction brakes in response to driving control signals received from the driving automation control system of the autonomous road vehicle.

In the system, the autonomous road vehicle may further include a vehicle inverter that supplies variable frequency AC power, the electric power delivered from the autonomous road vehicle to the railcar via the vehicle power delivery connection may be the variable frequency AC power, and the railcar motor may be a railcar AC motor powered by the variable frequency AC power. Then, the railcar driving control may control operation of the railcar motor by varying the variable frequency of the AC power supplied by the vehicle inverter.

In the system, the main power source may be a rechargeable battery pack, the railcar AC motor may be operable to apply regenerative braking, and the vehicle power delivery connection may be further operable to momentarily charge the rechargeable battery pack upon the regenerative braking.

In the system, the autonomous road vehicle may include a driver control that allows a human driver: (i) during automated road travel, to override the driving automation control system and manually apply emergency vehicle braking, and (ii) during automated railed travel, to override the driving automation control system and manually apply emergency railcar braking.

In the system, the railcar driving control may form part of the autonomous road vehicle or of the railcar.

In the system, the driving automation control system of the autonomous road vehicle may be operable to verify in advance that a sufficient amount of electric power is allocated for powering the railcar up to reaching a designated destination, as a precondition for the railcar transporting the autonomous road vehicle to the designated destination.

In the system, the railcar may further include a track switching control unit, and the railcar driving control may be further operable to control operation of the track switching control unit in response to driving control signals received from the driving automation control system of the autonomous road vehicle.

Under actual automated operation of the system, the autonomous road vehicle is mounted on the railcar and is in automated railed travel, the railcar motor is powered by the main power source of the autonomous road vehicle, and braking, and preferably also accelerating and/or track switching, is operating under control of the driving automation control system of the autonomous road vehicle.

According to preferred embodiments of the present invention, there is also provided a railcar operable to transport autonomous road vehicles on a railway. The railcar may include a deck operable to support an autonomous road vehicle, a railcar AC motor, and a railcar power delivery connection operable to deliver variable frequency AC power from a vehicle inverter of the autonomous road vehicle to power the railcar AC motor.

In the railcar, at least one of accelerating, braking or track switching may be controllable by driving control signals received from the autonomous road vehicle.

In the railcar, the railcar AC motor may be operable to selectably apply regenerative braking, and the railcar power delivery connection may be operable to momentarily deliver electric power to the autonomous road vehicle upon the regenerative braking.

All variations in this Summary of Preferred Embodiments section cover both single- and multiple-motor autonomous road vehicles as well as single- and multiple-motor railcars.

BRIEF DESCRIPTION OF THE DRAWINGS

The present invention will be understood and appreciated more fully from the following detailed description, taken in conjunction with the drawings in which:

FIG. 3A lists several example embodiments of railways.

FIGS. 3B and 3C are block diagrams that briefly elaborate on the concept of electronic control unit (ECU).

FIG. 6 is a flowchart depicting verification of sufficient electrical power toward mounting an autonomous road vehicle on a

DETAILED DESCRIPTION

Background Art

Figure 1A:
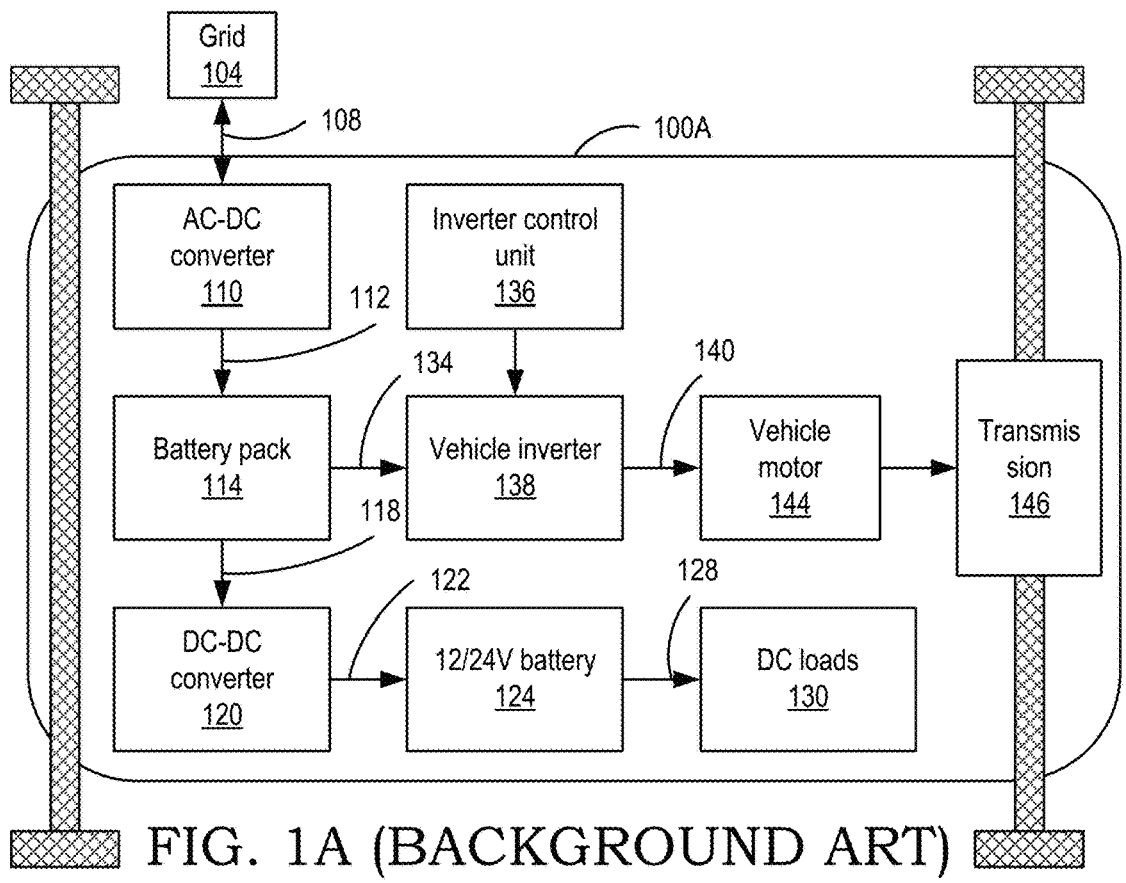
FIGS. 1A-1B are block diagrams schematically describing electric road vehicles of the background art.

Reference is made to FIG. 1A that schematically describes an autonomous road vehicle 100A of the background art. Battery pack 114 is loaded from the grid 104 via AC (alternating current) charging connection 108 and AC-DC converter 110 that supplies DC (direct current) charging current 112 to battery pack 114. Battery pack 114 provides hi-voltage DC power 118 to DC-DC converter 120 that supplies low voltage DC battery charging current 122 to 12/24V battery 124, which supplies low voltage power 128 to DC loads 130 such as lighting, climate control, multimedia systems, electronics, processors, and the like. Battery pack 114 also supplies hi-voltage DC current 134 to vehicle inverter 138, which supplies variable frequency AC power 140 to autonomous road vehicle motor 144, the frequencies determined by inverter control unit 136. Autonomous road vehicle motor 144 is an AC motor that revolves at an angular frequency, customarily measured in RPM (revolutions per minute) units, determined by the instant AC frequency provided by vehicle inverter 138, to drive, via transmission 146 the wheels of autonomous road vehicle 100A.

Figure 1B:
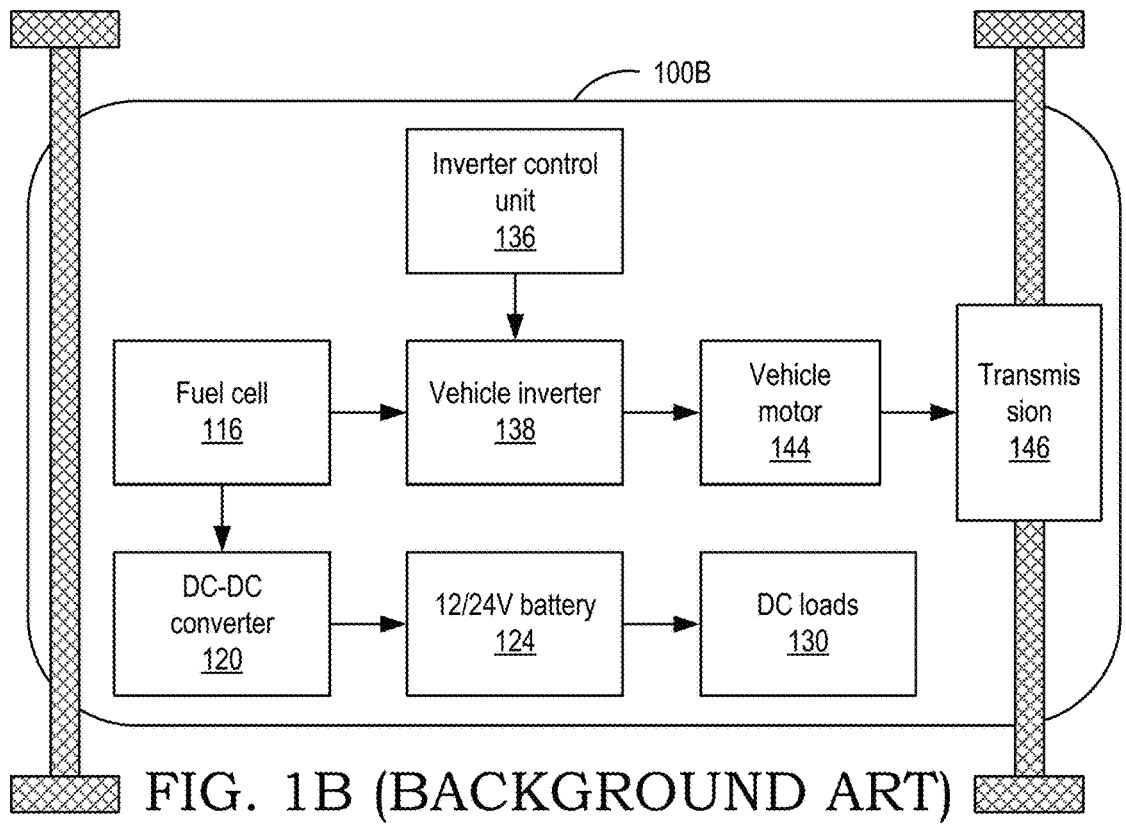

FIG. 1B schematically describes another version of autonomous road vehicle 100B of the background art, with battery pack 114 of FIG. 1A replaced by fuel cell 116, rendering AC-DC converter 110 and grid 104 of FIG. 1A redundant. All other numbered elements of FIG. 1B are the same as their corresponding elements in FIG. 1A.

Figure 1C:
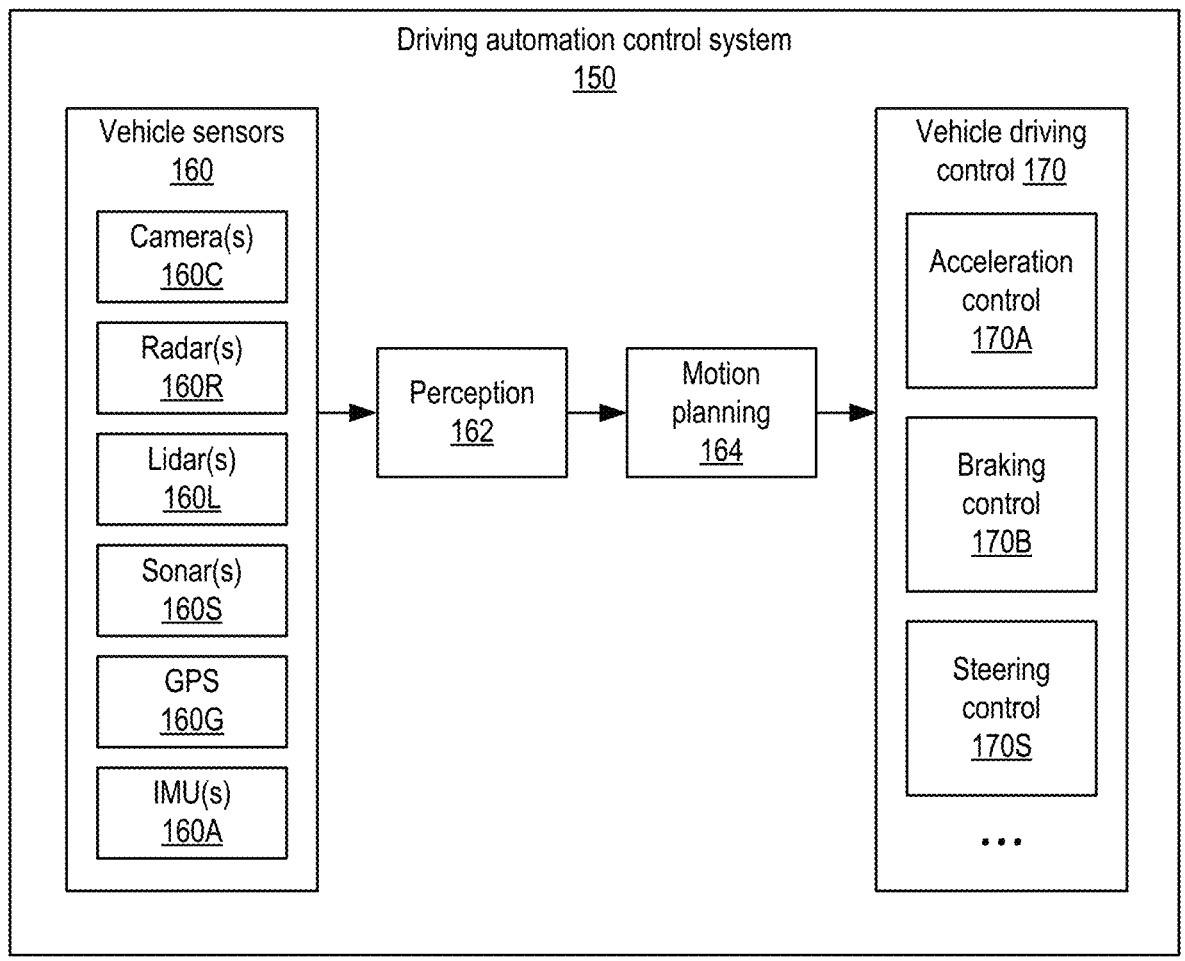
FIG. 1C schematically describes an example driving automation control system of the background art.

FIG. 1C schematically describes an example driving automation control system 150 of autonomous road vehicles of the background art. Vehicle sensors 160, include any or some or all of camera(s) 160C, radar(s) 160R, lidar(s) 160L, sonar(s) 160S, GPS 160G and/or IMU(s) 160A (IMU is inertial measurement unit such as accelerometers and gyroscopes). The vehicle sensors 160 continuously monitor the vehicle and driving environment, which are transformed by perception unit 162 and motion planning unit 164—both electronic control units known in the art of autonomous road vehicles—into driving control signals that selectably actuate acceleration control 170A, braking control 170B and/or steering control 170S of vehicle driving control 170 (all being electronic control units) to assist or replace a human driver.

Simplified Layout

Figure 2A:
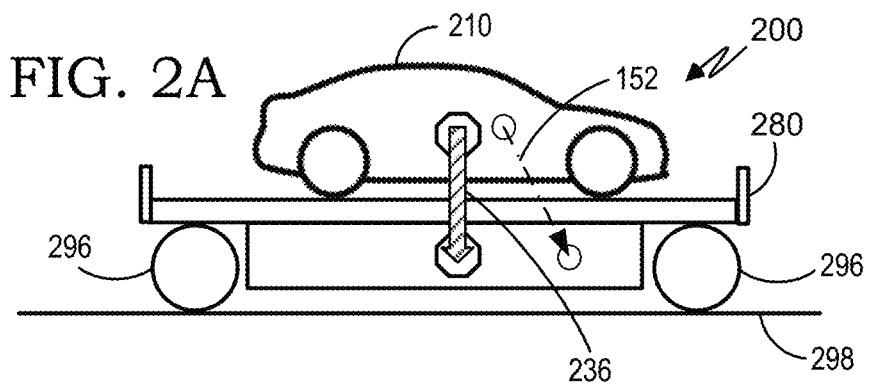
FIG. 2A schematically illustrates a simplified layout of a vehicle-on-railcar taught by the present disclosure.

FIG. 2A schematically depicts a simplified layout of a vehicle-on-railcar 200 taught by the present disclosure. Railcar 280 is supported by railcar wheels 296 on railway 298. Autonomous electric road vehicle 210 is mounted on railcar 280. Vehicle-railcar power delivery connection 236 delivers electric power from a main power source of autonomous electric road vehicle 210 to power an electric motor of railcar 280. Wireless or wired railcar driving control channel 152 delivers driving control signals from autonomous electric road vehicle 210 to railcar 280 to affect acceleration, braking, and/or track switching of railcar 280.

Figure 2B:
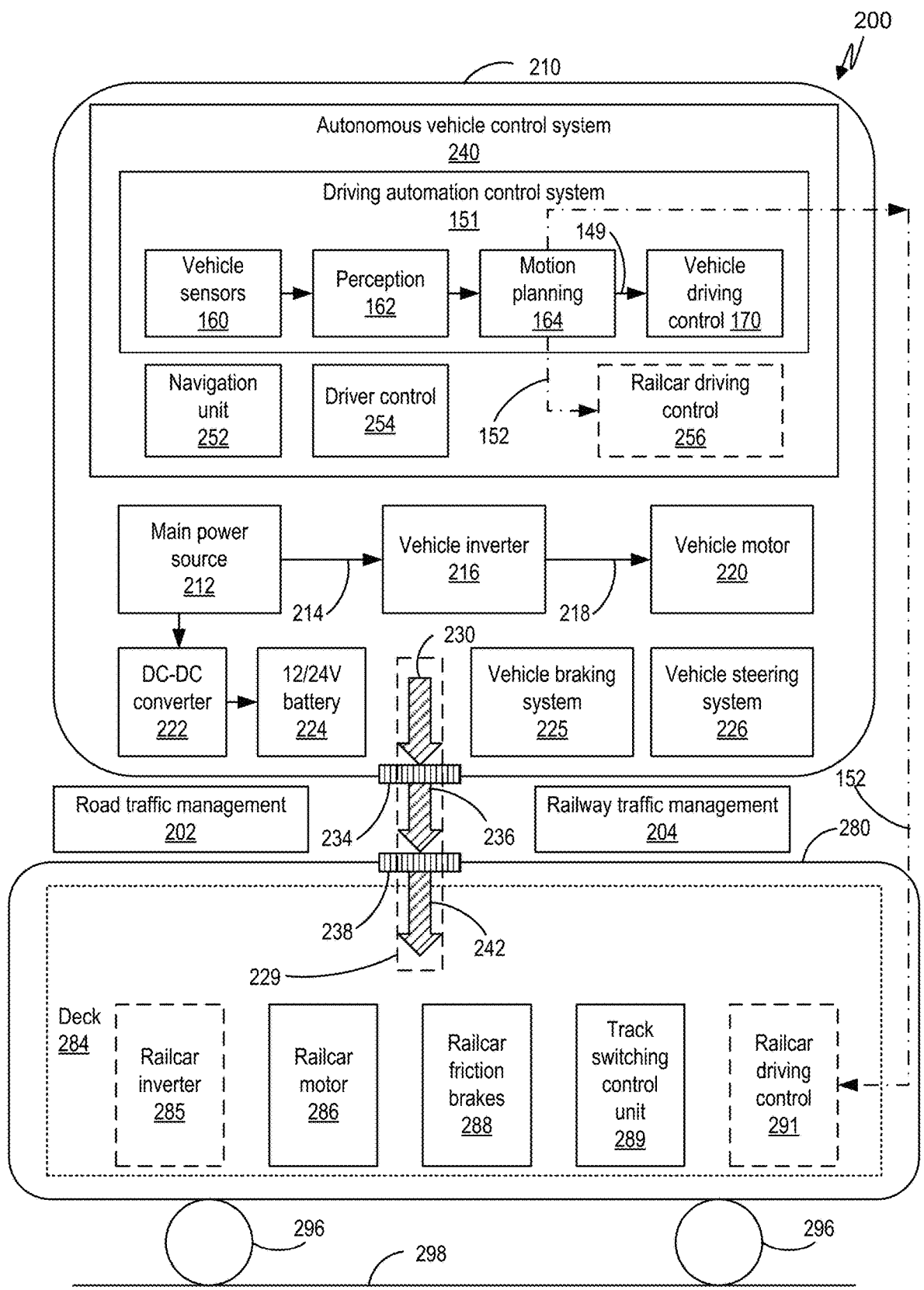
FIG. 2B is a schematic block diagram of the vehicle-on-railcar of FIG. 1.

FIG. 2B is a schematic block diagram of vehicle-on-railcar 200 of FIG. 2A. Autonomous electric road vehicle 210 is mounted on railcar 280 while powering railcar motor 286 and autonomously controlling at least one of accelerating, braking or track switching of railcar 280. Driving automation control system 151 is similar to driving automation control system 150 of FIG. 1C, further allowing exporting driving instructions, preferably adjusted according to railed transport friction and safety parameters, from motion planning unit 164 to railcar driving control 256 or railcar driving control 291 (FIGS. 2I-2J). Autonomous vehicle control system 240 includes driving automation control system 151, and preferably also a navigation unit 252 that provides route selection and driving guidance, and driver control 254 that allows manual driving by a human driver (FIG. 2K). Main power source 212 is either a rechargeable battery of a fuel cell, that supplies electric energy to power autonomous electric road vehicle 210 and railcar 280. DC-DC converter 222 charges 12/24V battery 224 to provide low-voltage power for electrical and electronic devices of both autonomous electric road vehicle 210 and railcar 280. Vehicle inverter 216 draws DC current 214 from main power source 212 and transforms it to variable-frequency AC power 218 that propels and controls the angular frequency (RPM) of vehicle motor 220. Vehicle steering system 226 and vehicle braking system 225 serve for driving autonomous electric road vehicle 210 on roads, either autonomously under the control of driving automation control system 151, or manually under the control of driver control 254.

A railcar driving control 256/291 is an ECU (electronic control unit) included in autonomous vehicle control system 240 or railcar 280, respectively, to control acceleration, braking and track switching of railcar 280, in response to driving control signals received from motion planning unit 164 via wired or wireless railcar driving control channel 152. The choice between placing railcar driving control 256 in autonomous electric road vehicle 210 or railcar driving control 291 in railcar 280, is determined by technical and ecosystem considerations. It is also an option to split functions of railcar driving control between autonomous electric road vehicle 210 and railcar 280; for example, to have a railcar driving control 256 that controls acceleration only via controlling the frequency of vehicle inverter 216, while braking and track switching are handled by railcar driving control 291. For simplicity of this specification, however, the detailed architectures of FIGS. 2C-2H assume having either railcar driving control 256 in autonomous electric road vehicle 210, or railcar driving control 291 in railcar 280, which are not excluding the possibility of split functions between units 256 and 291, as indicated above.

Power delivery connection 229 comprises wires and connectors that deliver electric power from autonomous electric road vehicle 210 to railcar 280 to power railcar motor 286. Power delivery connection 229 comprises vehicle power delivery connection 230 and vehicle power delivery connector 234 that form part of autonomous electric road vehicle 210; railcar power delivery connection 242 and railcar power delivery connector 238 that form part of railcar 280, and vehicle-railcar power delivery connection 236, such as a cable, that connects vehicle power delivery connector 234 and railcar power delivery connector 238, for example via plug-socket arrangement, when autonomous electric road vehicle 210 is mounted on railcar 280. In some embodiments, vehicle-railcar power delivery connection 236 may be null if vehicle power delivery connector 234 and railcar power delivery connector 238 are devised to engage directly when autonomous electric road vehicle 210 is mounted on railcar 280. It will be noted that power delivery connection 229 may function also to deliver low-voltage electricity from 12/24-volt battery 224 to railcar 280, to power low-power elements of railcar 260 such as brakes, lights, electronics and/or processors, including railcar driving control 291. This note also applies to FIGS. 2C-2H, and will not be repeated below. In embodiments that apply regenerative braking in railcar 280, power delivery connection 229 may also serve for momentarily charging a main power source 212 that is a rechargeable battery, from railcar motor 286.

Railcar 280 is supported by railcar wheels 296 on railway 298. Deck 284 is any physical arrangement configured to support autonomous road vehicle 210 when transported by railcar 280. Railcar motor 286 drives the railcar wheels 296; if regenerative braking is applied, railcar motor 286 also takes part in railcar braking and in charging the main power source 212. Railcar friction brakes 288 handle braking, possible in cooperation with regenerative braking applied via railcar motor 286. Track switching control unit 289 handles track switching, if needed, possibly via communication with a track switching system that forms part of the railway system. In an embodiment, track switching control unit 289 may also provide electrical energy to a track switching mechanism that lacks electricity supply of its own, while slowing down or temporarily halting the railcar toward a track switching point. Railcar inverter 285 is optionally included in railcar 280, for cases where the power delivered from autonomous electric road vehicle 210 to railcar 280 is DC power, as described below with reference to FIGS. 2D and 2G.

Road traffic management 202 is an external compute and communication system that may communicate with autonomous road vehicles and provides them with road maps, speed limits, current traffic, and the like, optionally considered by motion planning unit 164 for planning driving instructions for vehicle driving control 170. Railway traffic management 204 is an external compute and communication system that may communicate with autonomous road vehicles and provides them with railway maps, railcar speed limits, current railcar traffic, and the like, optionally considered by motion planning unit 164 for planning driving instructions for railcar driving control 256/291. In some embodiments, road traffic management 202 and/or railway traffic management 204 may operate also for traffic management, fleet management, reservation management, charging management, and other system-level tasks. Optional road traffic management 202 and railway traffic management 204 are implicitly included also in the embodiments of FIGS. 2C-2H below.

Variations of Power Delivery and Railcar Driving Control

FIGS. 2C-2H describe three variations of vehicle-railcar power delivery, coupled with two variations of the location of the railcar driving control. As discussed above, the railcar driving control functions may also be split between the road vehicle and railcar, which is not covered in FIGS. 2C-2H.

Figure 2C:
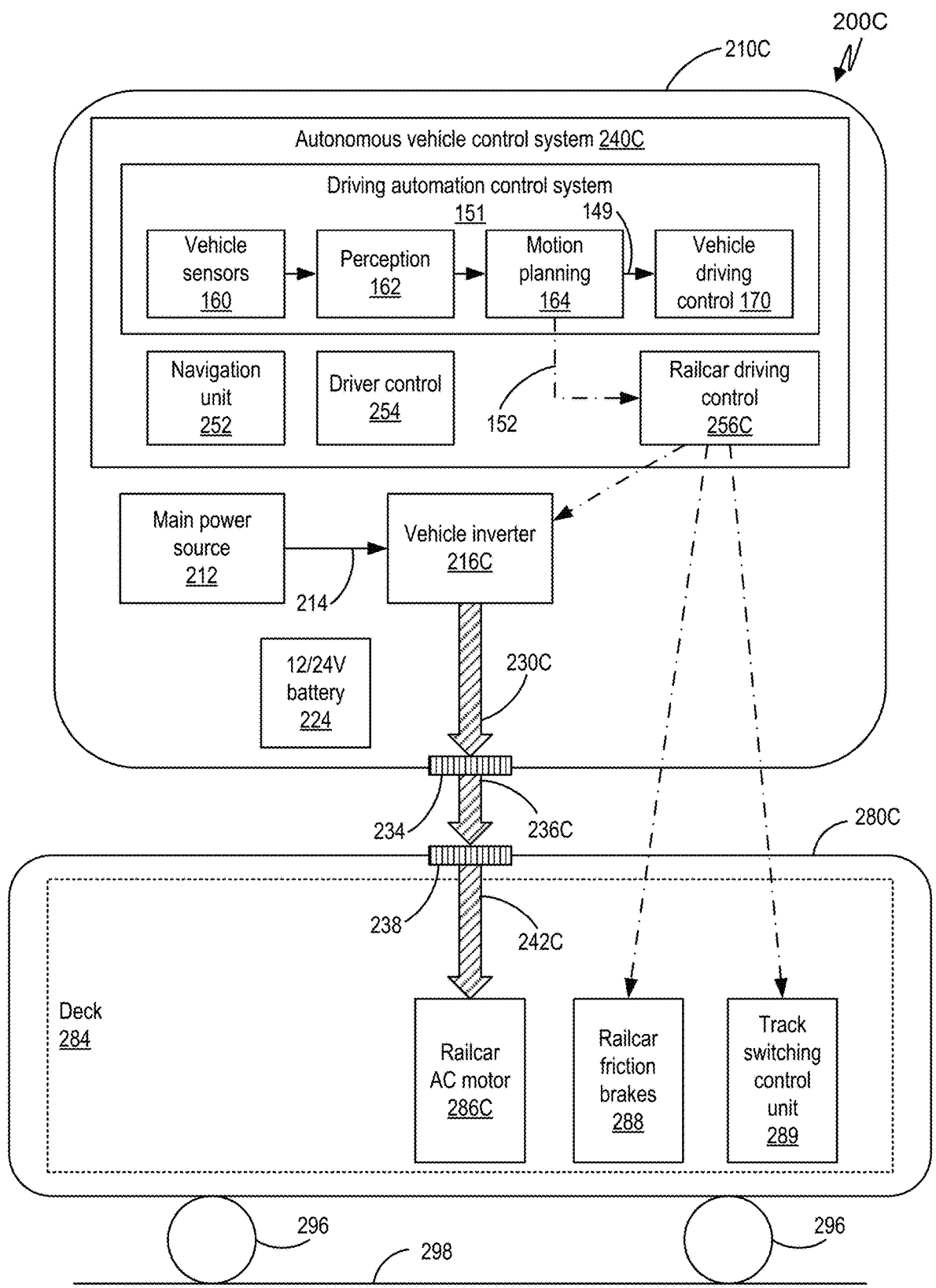
FIGS. 2C-2H are six block diagrams depicting three variations of vehicle-railcar power delivery, coupled with two variations of the location of the railcar driving control.

FIG. 2C describes vehicle-on-railcar 200C, where the electric power delivered from autonomous electric road vehicle 210C to railcar 280C is variable frequency AC power supplied by vehicle inverter 216C via vehicle Power delivery connection 230C, vehicle-railcar Power delivery connection 236C and railcar Power delivery connection 242C, to power railcar AC motor 286C that drives railcar 280C and control acceleration of the railcar. Railcar driving control 256C is an ECU (electronic control unit) that controls railcar acceleration by varying the AC frequency of vehicle inverter 216C; controls railcar braking via controlling railcar friction brakes 288; and controls track switching via controlling track switching control unit 289. If regenerative braking is applied, then braking control is split between controlling vehicle inverter 216 for braking, and controlling railcar friction brakes 288. Other numbered elements of FIG. 2C that were not specifically mentioned with reference to FIG. 2C, operate as described above with reference to identically or similarly numbered elements of FIG. 2B.

Figure 2D:
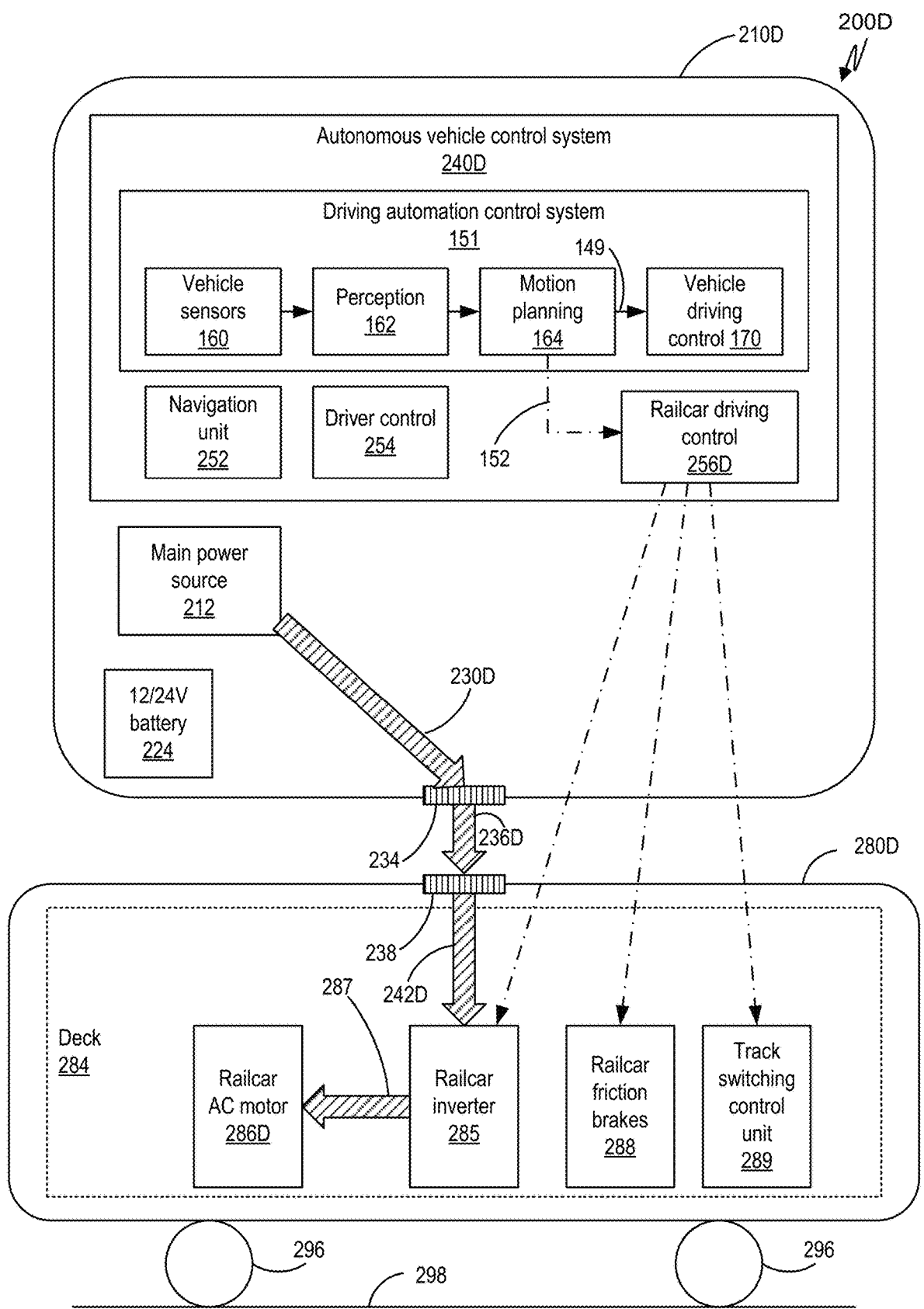

FIG. 2D describes vehicle-on-railcar 200D, that features supply of DC power from main power source 212 of autonomous electric road vehicle 210D to railcar inverter 285 of railcar 280D via vehicle Power delivery connection 230D, vehicle-railcar Power delivery connection 236D, and railcar Power delivery connection 242D. Railcar inverter 285 then generates variable-frequency AC power 287 to power railcar AC motor 286D. Railcar driving control 256D functions similarly to railcar driving control 256C of FIG. 2C, except controlling railcar inverter 285 rather than vehicle inverter 216C. Other numbered elements of FIG. 2D that were not specifically mentioned with reference to FIG. 2D, operate as described above with reference to identically or similarly numbered elements of FIG. 2B.

Figure 2E:
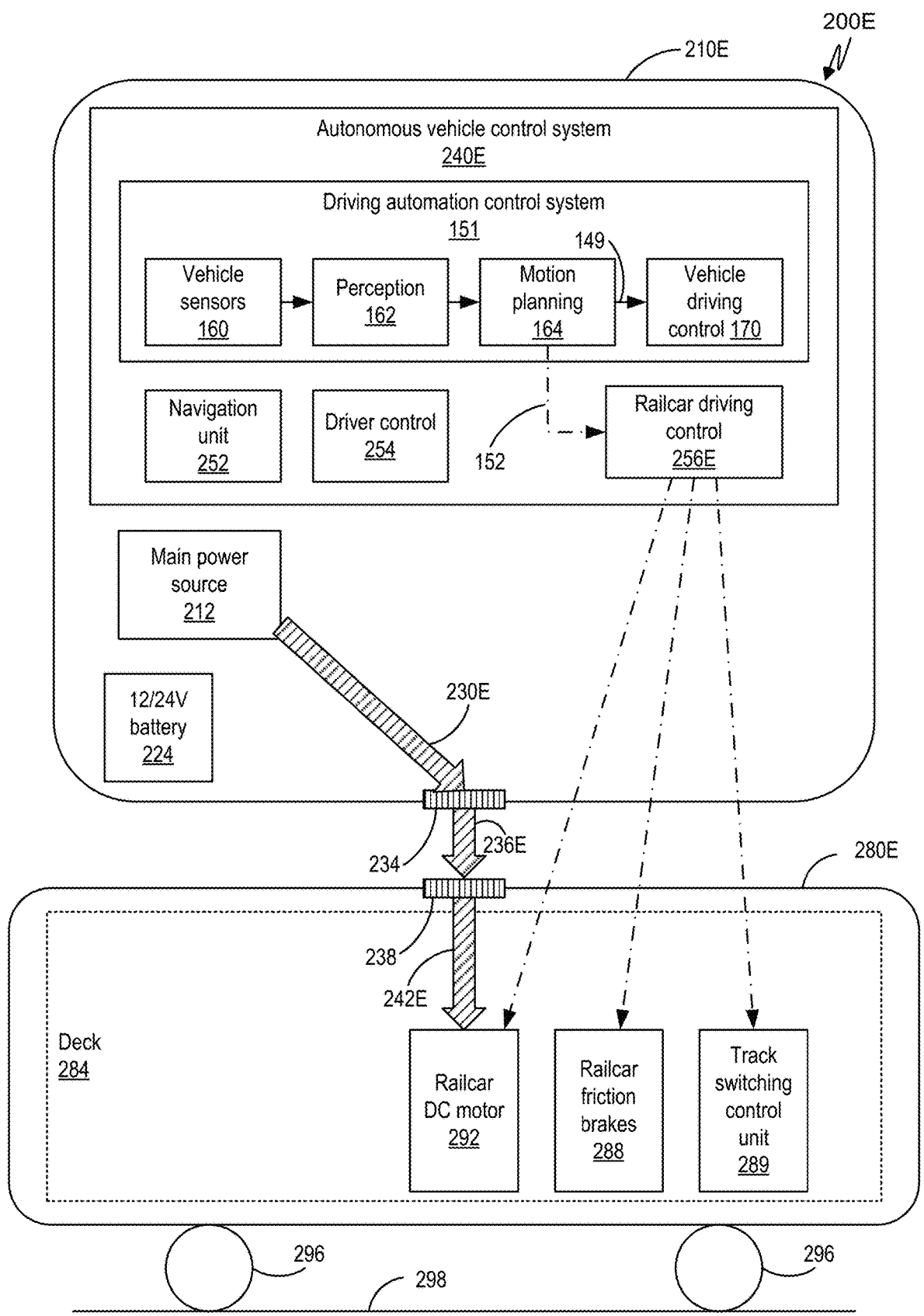

FIG. 2E describes vehicle-on-railcar 200E where main power source 212 of autonomous electric road vehicle 210E supplies DC power to railcar DC motor 292 of railcar 280E. Railcar driving control 256E actuates railcar DC motor 292 to control acceleration, railcar friction brakes 288 to control braking, and track switching control unit 289 to control track switching. Other numbered elements of FIG. 2E that were not specifically mentioned with reference to FIG. 2E, operate as described above with reference to identically or similarly numbered elements of FIG. 2B.

Figure 2F:
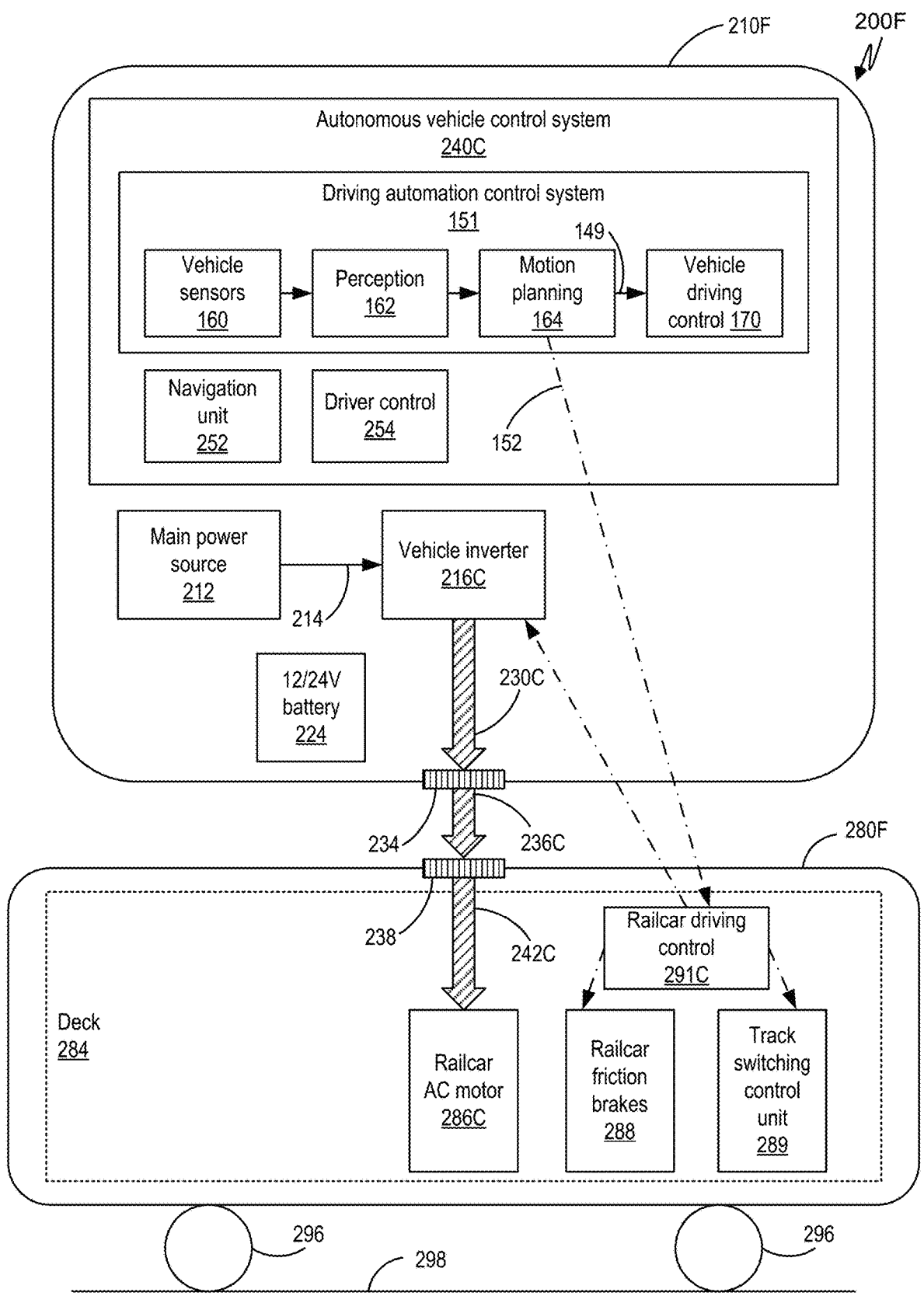

FIG. 2F describes vehicle-on-railcar 200F that is similar to vehicle-on-railcar 200C of FIG. 2C, except that railcar driving control 291C is moved from autonomous electric road vehicle 210F to form part of railcar 280F. All operations remain the same as in vehicle-on-railcar 200C.

Figure 2G:
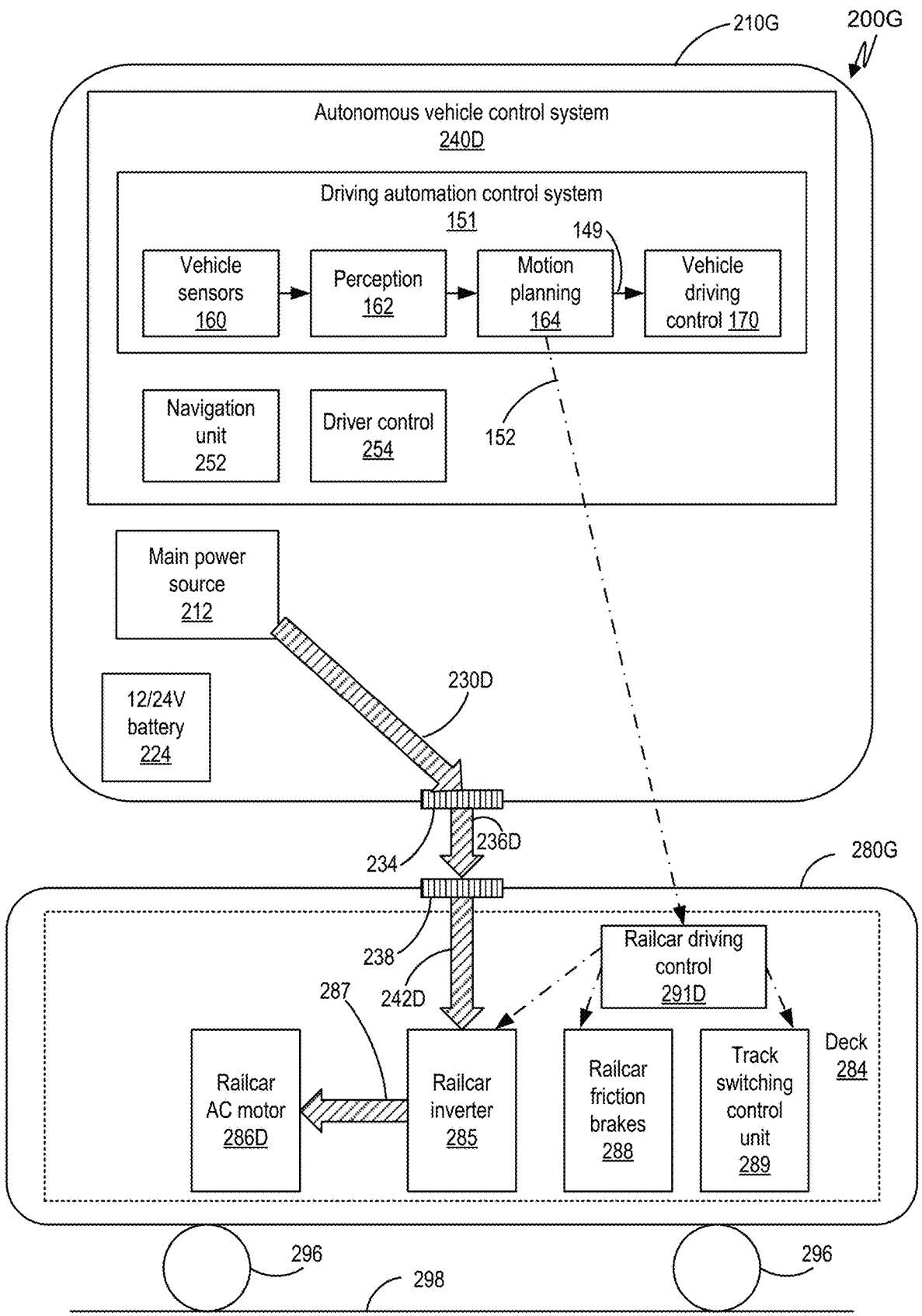

FIG. 2G describes vehicle-on-railcar 200G that is similar to vehicle-on-railcar 200D of FIG. 2D, except that railcar driving control 291D is moved from autonomous electric road vehicle 210G to form part of railcar 280G. All operations remain the same as in vehicle-on-railcar 200D.

Figure 2H:
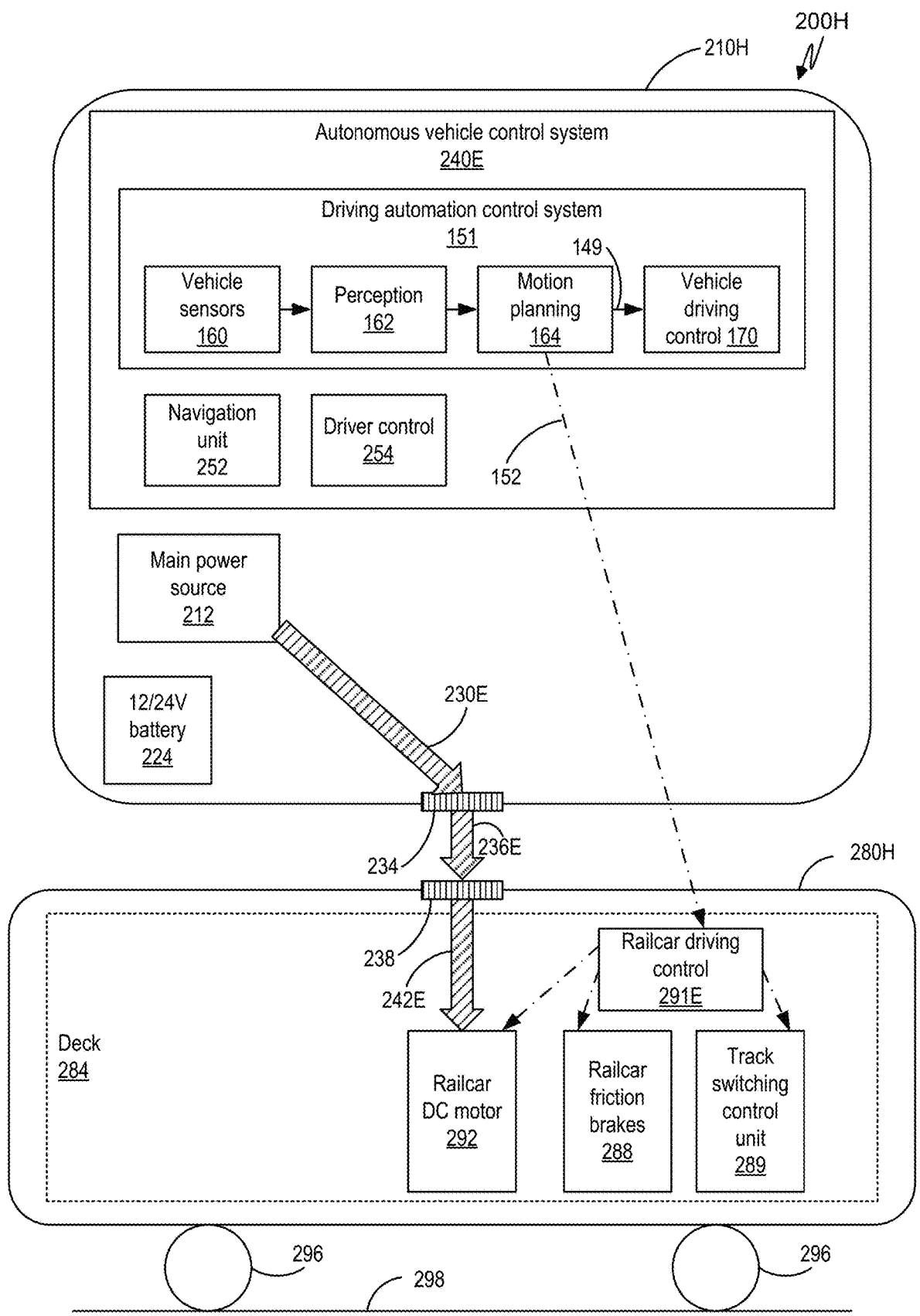
Figure 2I:
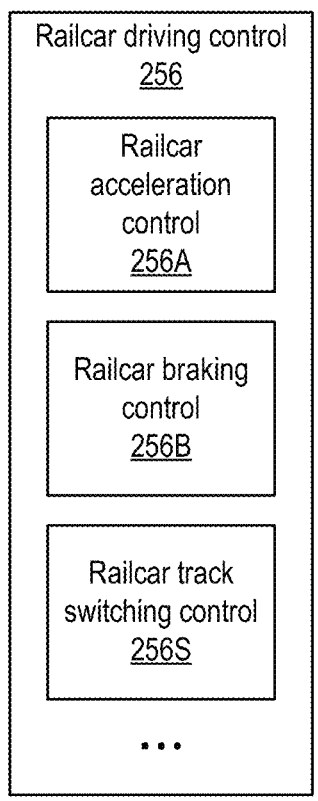
FIGS. 2I-2J are block diagrams schematically describing railcar driving controls of FIG. 2B located in the road vehicle or railcar, respectively.
Figure 2J:
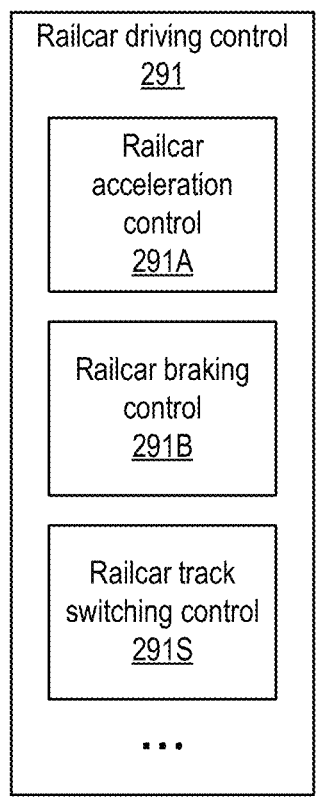
Figure 2K:
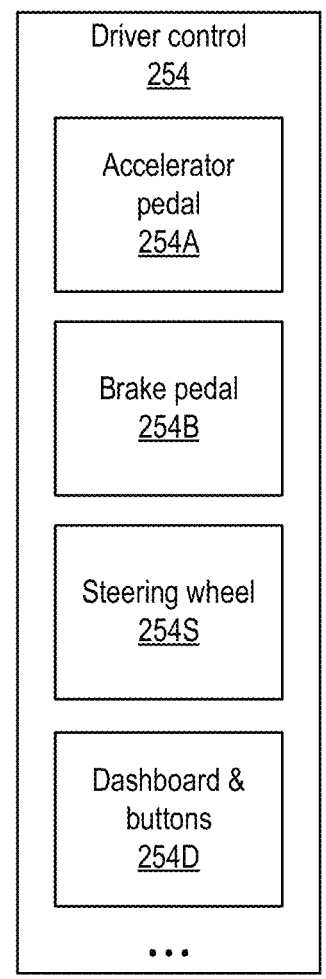
FIG. 2K is a block diagram describing the driver control of FIG. 2B.

FIG. 2H describes vehicle-on-railcar 200H that is similar to vehicle-on-railcar 200E of FIG. 2E, except that railcar driving control 291E is moved from autonomous electric road vehicle 210F to form part of railcar 280H. All operations remain the same as in vehicle-on-railcar 200E.

Driving Controls

FIG. 2I schematically describes railcar driving control 256 of FIG. 2B and its variations in FIGS. 2C-2H. Railcar acceleration control 256A is an ECU (electronic control unit) that controls acceleration of railcar 280. Railcar braking control 256B is an ECU that controls braking of railcar 280, which may combine regenerative and friction braking where applicable. Railcar track switching control 256S is an ECU that controls track switching of railcar 280, possibly via communication with a track switching system that forms part of the railway system.

FIG. 2J describes railcar driving control 291, which is an ECU similar to railcar driving control 256 of FIG. 2I, except of railcar driving control 291 forming part of railcar 280.

As noted above, the railcar driving control functions may also be split between the road vehicle and railcar, which is not reflected in FIGS. 2I-2J.

FIG. 2K describes driver control 254 of FIGS. 2B-2H, that may include accelerator pedal 254A, brake pedal 254B, steering wheel 254S and dashboard & buttons 254D. During road travel, driver control 254 may be operated by a human driver conventionally, for manual driving as needed or desired. During railed travel, driver control 254 may be required or selectably actuated by a human driver, at least for emergency braking of vehicle-on-railcar 200.

Example Railways

FIG. 3A lists several example embodiments of railway 298 of FIGS. 2B-2H. In embodiment 298A the railway is laid on the ground; in embodiment 298B the railway is elevated above the ground; in embodiment 298C the railway is laid underground. Embodiments 298D and 298E refer to dual rail and monorail, respectively.

It will be appreciated that vehicle-on-railcar that are intended to carry primarily passengers and/or are operated only at low speed in urban or mountain areas, may afford narrower, light-duty railways that are easier and less expensive to deploy and maintain than standard railways.

For safety reasons, vehicle-on-railcar preferably use dedicated railways. However, time sharing is also an option, for example vehicle-on-railcar traveling during the day, while cargo trains traveling at night.

Electronic Control Units

FIGS. 3B and 3C briefly elaborate on the concept of an electronic control unit (ECU), defined above as an embedded module in automotive electronics that controls one or more of the electrical systems or subsystems in a motor vehicle.

FIG. 3B depicts a simple electronic control unit 300 which includes program memory 304 made of non-transitory computer-readable media that stores program code 308, and a processor 312. When processor 312 is loaded with and runs program code 308, it performs a useful function that is the purpose of electronic control unit 300, such as actuating and controlling braking of a vehicle.

FIG. 3C depicts an example larger electronic control unit 360 that comprises a non-transitory computer-readable program memory 364, and three program codes 368A, 368B and 368C that run on processor 372 to preform three useful functions. In the present example, electronic control unit 360 also comprises electronic control unit 300x and electronic control unit 300Y, each with its own non-transitory computer-readable program memory, program code and processor.

Operation

Figure 4:
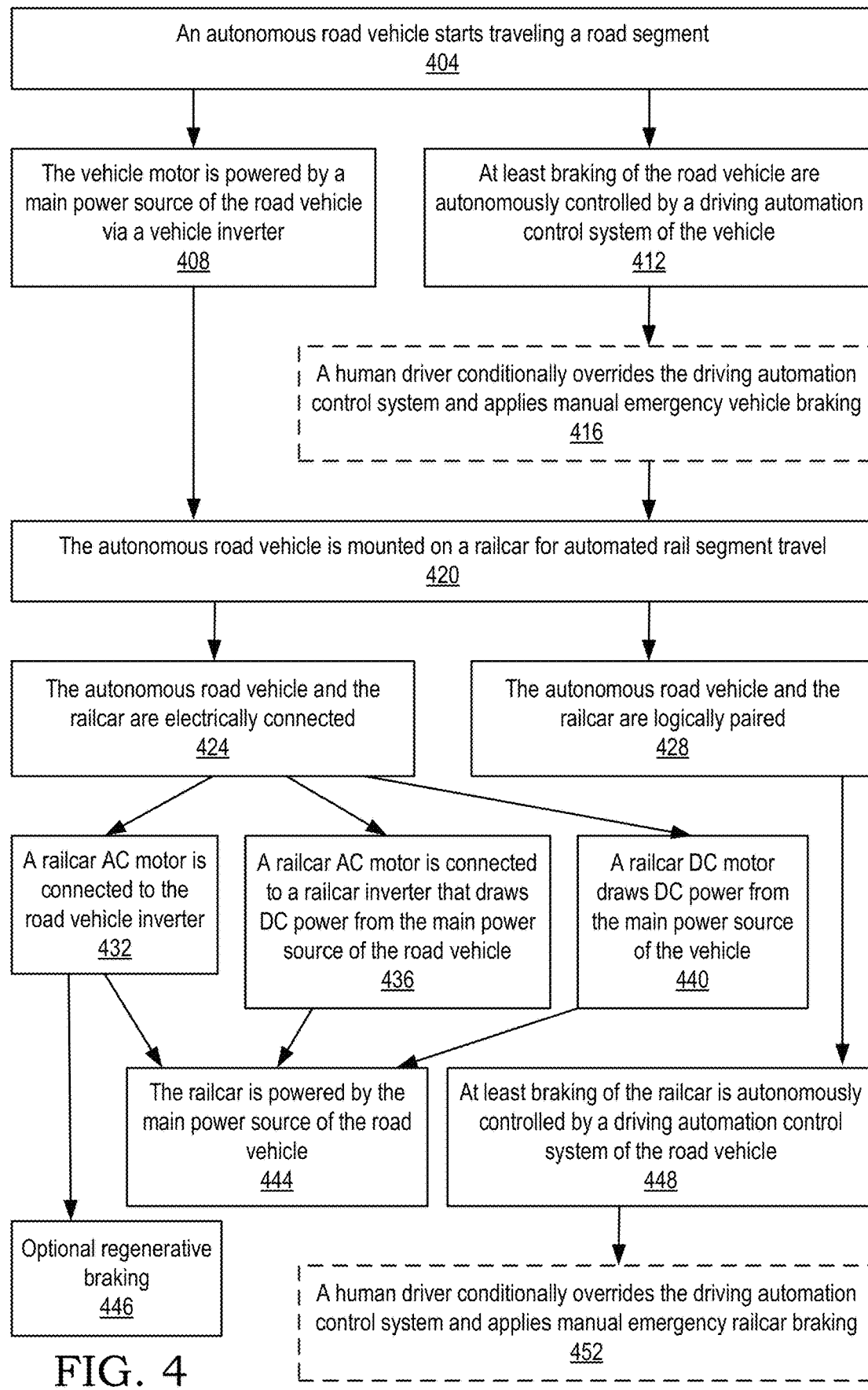
FIG. 4 is a flowchart describing the operation of an embodiment of the present disclosure.

FIG. 4 is a flowchart describing the operation of an embodiment of the present disclosure, wherein an autonomous road vehicle starts conventionally traveling a road segment, and is then mounted on a railcar for traveling a rail segment. Steps on the left-hand side of the flowchart pertain to electric power delivery, while steps on the right-hand side pertain to driving control. Autonomous operation implies that the road vehicle includes a driving automation control system 151 of FIG. 2B capable of automated driving which allows at least automated accelerating or braking, with or without driver supervision, depending on the instant automation level.

With reference also to FIG. 2B, in step 404 an autonomous road vehicle, such as autonomous electric road vehicle 210, starts conventionally traveling a road segment, according to the applicable automation level. In step 408 the vehicle motor, such as vehicle motor 220, is powered by the main power source of the road vehicle, such as main power source 212, which may be a rechargeable battery pack or a fuel cell, preferably via a vehicle inverter such as vehicle inverter 216.

Concurrently with step 408, in step 412 at least braking, and possibly also acceleration and steering, according to the applicable automation level of autonomous electric road vehicle 210, are autonomously controlled by the driving automation control system of the road vehicle, such as driving automation control system 151 of FIG. 2B. In step 416 a human driver conditionally overrides the driving automation control system and manually applies emergency vehicle braking. Step 416 is marked by a dashed frame as conditional—since in many rides it will not be applied, and if the current automated driving level of autonomous electric road vehicle 210 is driverless, step 416 may be unavailable.

In step 420 the road segment has ended, and the autonomous road vehicle is mounted on a railcar for traveling a rail segment. The vehicle-on-railcar 200 of FIG. 2B then starts a railed travel. In step 424 the autonomous electric road vehicle 210 and railcar 280 are electrically connected. The electrical connection of step 424 is formed as step 432 of connecting railcar AC motor 286C to the vehicle inverter 216 (FIG. 2C or 2F); or step 436 of connecting railcar AC motor 286D to railcar inverter 285 that draws DC power from main power source 212 (FIG. 2D or 2G); or step 440 of railcar DC motor 292 that draws DC power from main power source 212 (FIG. 2E or 2H). In step 444, during the railed trip of vehicle-on-railcar 200, railcar 280 is effectively powered by the main power source 212 of autonomous electric road vehicle 210.

If main power source 212 is a rechargeable battery pack and railcar AC motor of step 432 allows regenerative braking, then step 446 applies regenerative braking as needed, with power delivery connection 229 momentarily delivering electric power from railcar motor 286 to recharge main power source 212 upon regenerative braking.

Concurrently with powering the vehicle-on-railcar 200, the road vehicle and railcar are logically paired in step 428, so that driving automation control system 151 of the autonomous road vehicle starts controlling the railcar 280 (and eventually the vehicle-on-railcar 200) via railcar driving control 256 or railcar driving control 291. In step 448 at least braking, and possibly also acceleration and track switching, according to the applicable automation level of vehicle-on-railcar 200, are autonomously controlled by the driving automation control system of the road vehicle, such as driving automation control system 151 of FIG. 2B. In step 452 a human driver conditionally overrides the driving automation control system and manually applies emergency vehicle braking. Step 452 is marked by a dashed frame as conditional—since in many rides it will not be applied, and if the automated driving level of vehicle-on-railcar 200 is driverless, step 452 may be unavailable.

Power Delivery from Several Autonomous Road Vehicles

In some embodiments, a railcar may carry two (or more) autonomous road vehicles. While a typical contemporary autonomous road vehicle can provide 100 kW or more of power that is sufficient to transport, for example, several road vehicles on a railcar, it may be the interest of the participating autonomous road vehicle drivers to equally share the electric energy contributed for their joint railed travel. A technical way of doing so may be based on cyclic time sharing, wherein each road vehicle delivers power to the railcar motor for, say, one minute, and is then disconnected and power is delivered to the railcar from the next road vehicle in the cycle. Driving automation control may remain with the first vehicle in the row, whose sensors best serve the vehicles-on-railcar of the present scenario. Driving automation control by the first vehicle in the row may be implemented also in case of autonomous trains, such as in the case of FIG. 5B below. Other methods for consolidating electrical power and/or driving control from multiple sources extend beyond the scope of the present disclosure.

Vehicle-on-Railcar Examples

FIGS. 5A-5H depict example vehicle-on-railcar that are constructed and operating according to preferred embodiments of the present invention. The figures focus on vehicle-to-railcar power delivery.

Figure 5A:
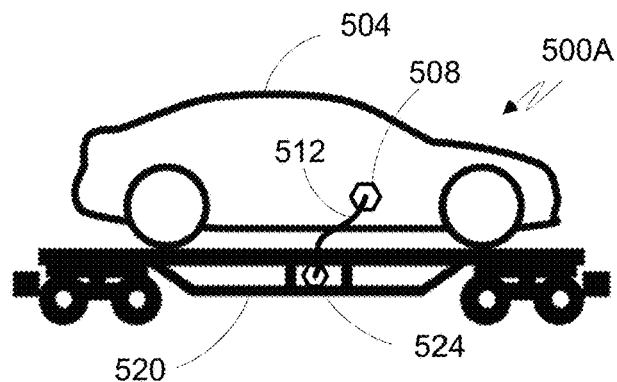
FIGS. 5A-5H are illustrations depicting example autonomous electric road vehicles transported by electric railcars.

FIG. 5A depicts vehicle-on-railcar 500A that is autonomous road vehicle 504 mounted on railcar 520. A railcar motor of railcar 520 (not shown) is powered by autonomous road vehicle 504 via vehicle power delivery connector 508, vehicle-railcar power delivery connection 512, and railcar power delivery connector 524.

Figure 5B:
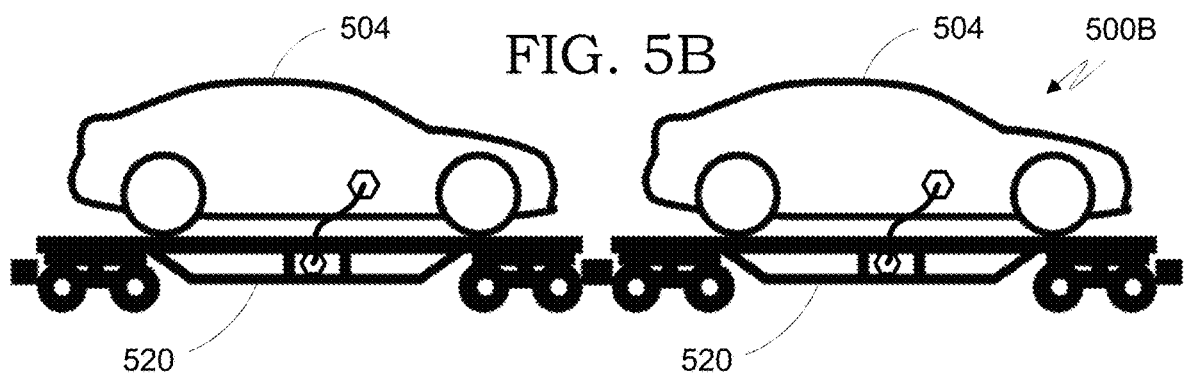

FIG. 5B depicts loaded electric train 500B that is a train of two vehicle-on-railcar units of FIG. 5A.

Figure 5C:
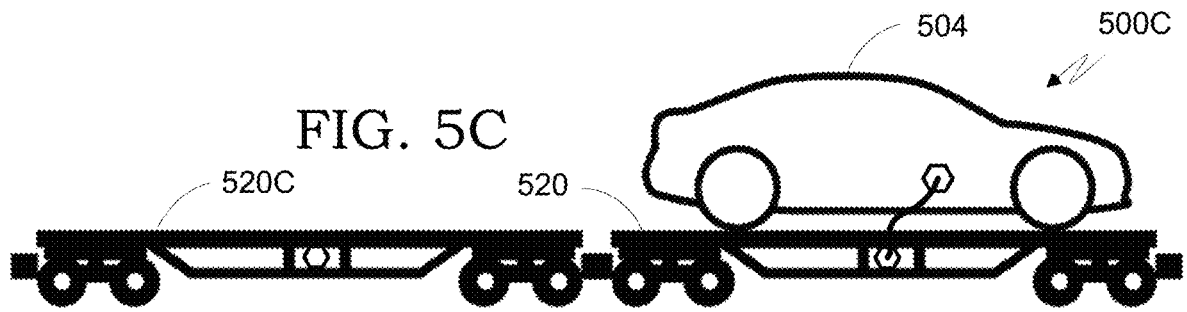

FIG. 5C depicts loaded electric train 500C that is similar to loaded electric train 500B of FIG. 5B, except that the second railcar 520C is not loaded, and is towed and/or powered by railcar 520. This configuration may be useful for returning empty railcars to loading points that face a shortage of railcars.

Figure 5D:
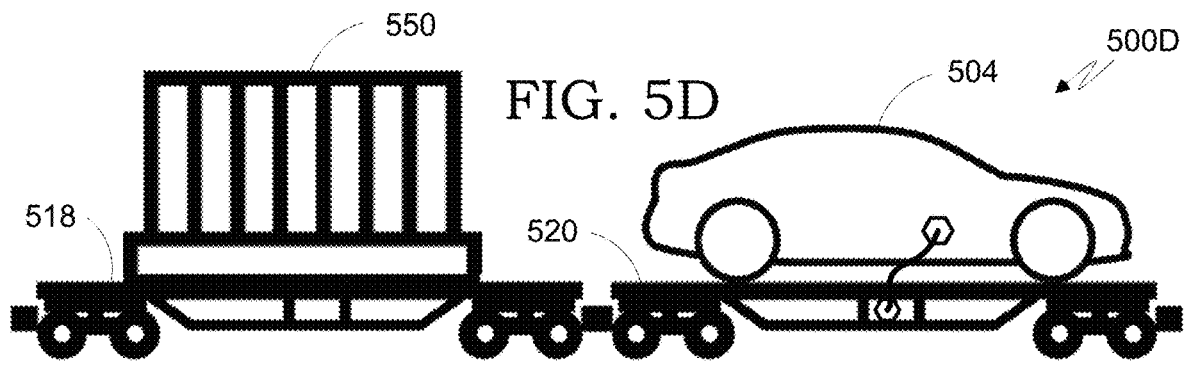

FIG. 5D depicts loaded electric train 500D made of vehicle-on-railcar 500A of FIG. 5A towing a dumb (non-motorized) railcar 518 carrying arbitrary cargo 550.

Figure 5E:
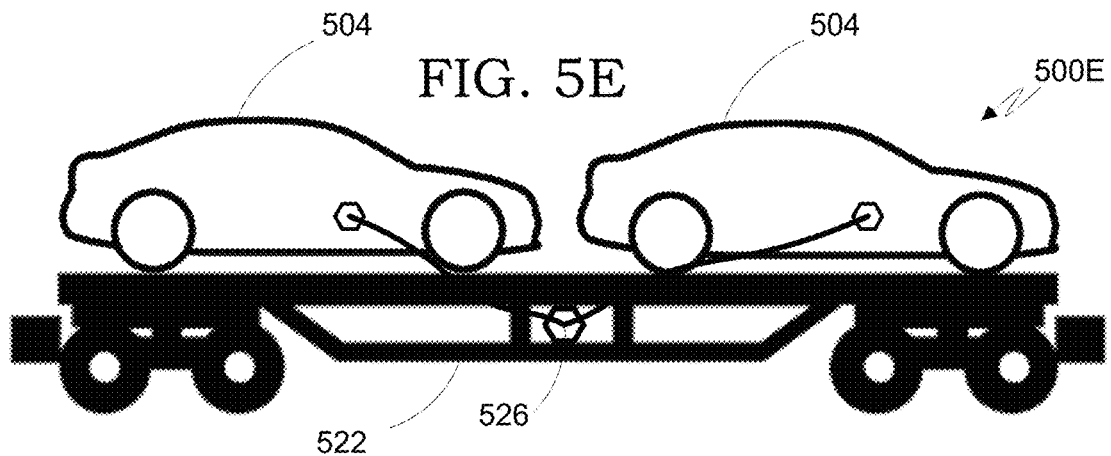

FIG. 5E depicts an extended vehicle-on-railcar 500E that is an extended railcar 522 that carries and is powered by two of autonomous road vehicle 504. Extended railcar 522 has a motor receiving power from the two autonomous road vehicles via a two-port railcar power delivery connector 526. As noted above, power delivery from two (or more) sources may be based, for example, on cyclic time sharing, wherein each autonomous road vehicle delivers power to the railcar for, say, one minute, and is then disconnected and power is delivered to the railcar from the next autonomous road vehicle in the cycle.

Figure 5F:
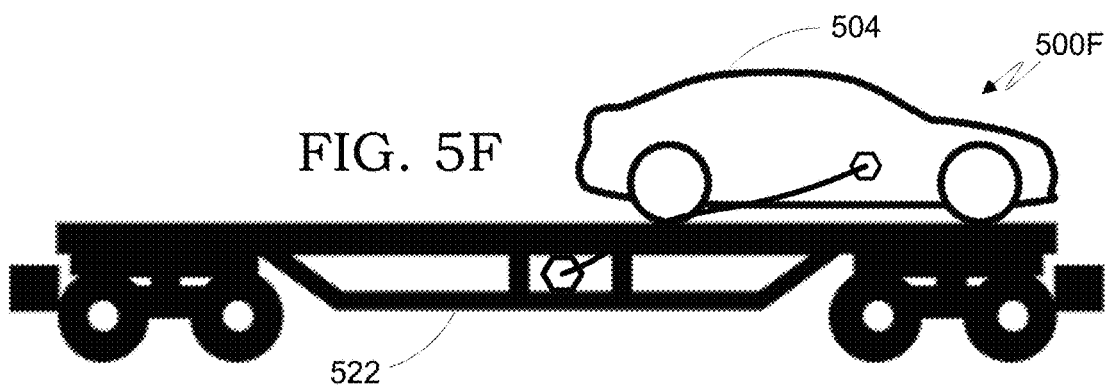

FIG. 5F depicts vehicle-on-railcar 500F where the extended railcar 522 is loaded with and powered by a single autonomous road vehicle 504.

Figure 5G:
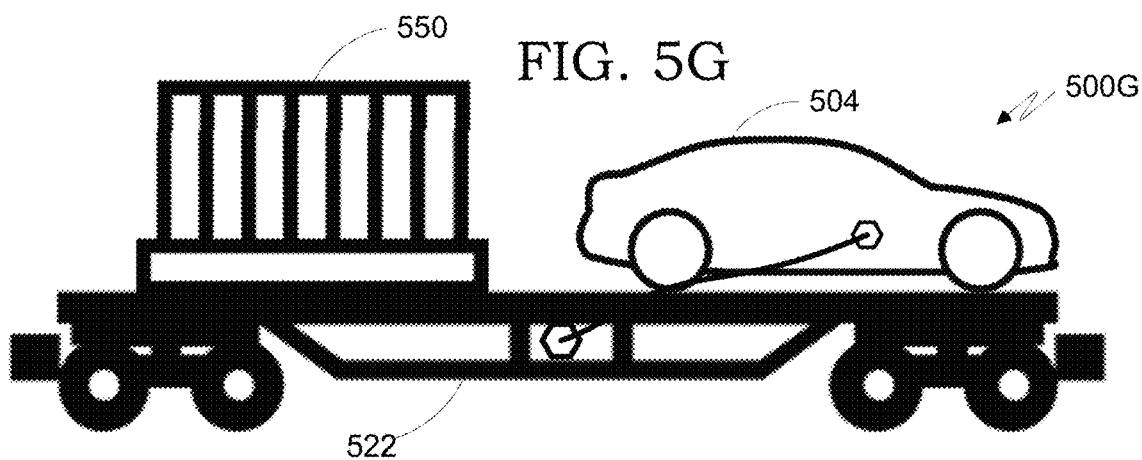

FIG. 5G depicts vehicle-on-railcar 500G where the extended railcar 522 that carries and is powered by autonomous road vehicle 504, is loaded also with arbitrary cargo 550.

Figure 5H:
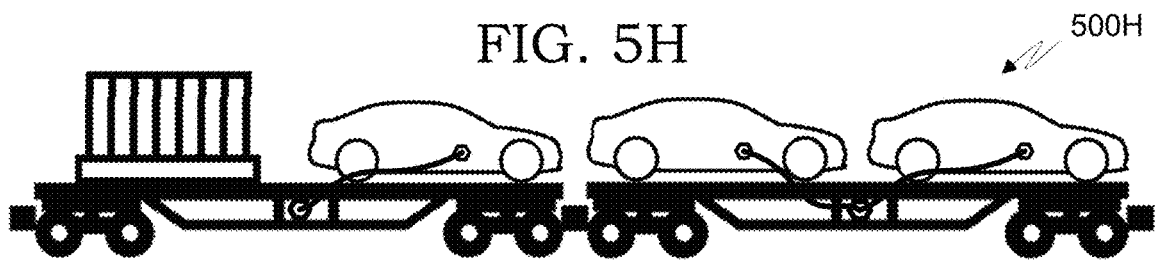

FIG. 5H depicts electric train 500H that includes two vehicle-on-railcar units powered by autonomous road vehicles and also carrying arbitrary cargo.

Verifying Sufficient Electrical Energy in Advance

Figure 6:
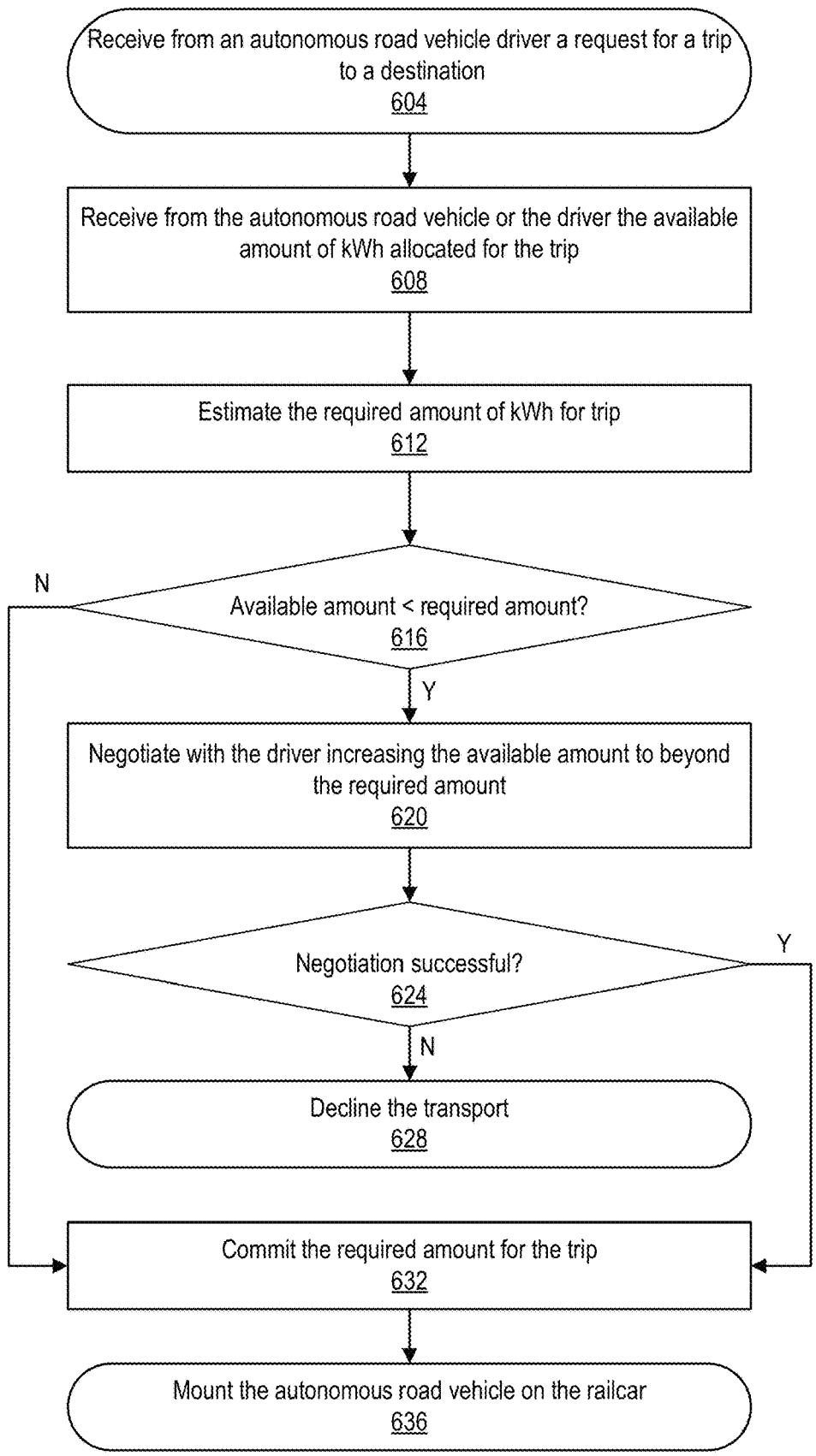

FIG. 6 is a flowchart depicting verifying in advance that an autonomous road vehicle has and allocates a sufficient amount of electrical energy (kWh) in its main power source, for powering the railcar that transports the autonomous road vehicle up to reaching a designated destination. The flowchart is to be preferably implemented in the autonomous vehicle control system 240 (FIG. 2B). Alternatively, the flowchart can be implemented in a separate access control system that controls access of autonomous road vehicles to railcars.

In step 604 a request for transport to a specified destination is received from a human driver via communication with a smartphone or via a keypad included in driver control 254 (FIG. 2B).

In step 608, an amount of kWh available and allocated for the transport is received from the road vehicle or the driver. Often, the amount allocated for the transport may be smaller than the remaining kWh amount in the main power source, since there may be a need for reserving electrical energy also for subsequent trips prior to recharging the battery pack or replenishing the fuel cell of the road vehicle.

In step 612 the amount of kWh required to reach the destination, by the vehicle-on-railcar, is estimated according to route, weight and distance data, preferably including a safety factor. In step 616 the available amount of step 608 is compared to the required amount of step 612. If the available amount is sufficient, then in step 632 the autonomous road vehicle commits to provide the available amount during the travel to the destination, and in step 636 the autonomous road vehicle is mounted on the railcar.

If step 616 finds that the available amount is insufficient, yet the remaining amount of kWh in the main power source of the autonomous road vehicle is sufficient, then step 620 negotiates with the autonomous road vehicle driver providing the required amount, which may oblige the driver to change travel plans, turn off climate control, or recharge earlier than originally planned. If in step 624 the negotiation is successful, then steps 632 and 636 are executed. Otherwise, the transport is declined in step 628 for insufficient kWh supply for reaching the designated destination.

Example Use Cases

Road-Rail Travel

A basic use case for a vehicle-on-railcar is a trip of an autonomous road vehicle that involves both road and rail segments.

An autonomous road vehicle drives a short road segment conventionally, according to the road vehicle's level of autonomy. The autonomous road vehicle is then mounted on a railcar, and the vehicle-on-railcar starts a cruise on a long railway segment. Finally, the autonomous road vehicle disembarks from the railcar and resumes conventional driving on a short road segment. An example of such trip is a first mile road segment from home to a nearby railway, a cruise of the vehicle-on-railcar on a long rail segment, and finally a final mile road segment of conventional driving from the rail to a destination.

Public Transportation Example

The following use case of road-rail travel assumes automated railed travel that is approved for driverless travel.

A public transportation electric road vehicle, such as a bus or taxi, starts a short conventional road journey (say, 10 minutes) attended by a human driver, for picking up passengers. When mounted on a railcar, the driver leaves the vehicle-on-railcar with its passengers, for a driverless cruise of, say, 2 hours, while the driver moves to another bus or taxi that disembarks from another railcar. When approaching the destination area, another driver joins the road vehicle for disembarking from the railcar and driving conventionally for dropping-off passengers along the final segment.

Railed Travel to and at Campuses and City Centers

The following use cases envision campuses, such as industrial zones, airports, universities, military sites, government sites, etc., as well a city centers, having a rail network interconnecting main sites of the campus or city center, and all vehicle-on-railcar approved for driverless railed travel.

A user drives her autonomous road vehicle conventionally until reaching a dedicated railway and mounting the autonomous road vehicle on a railcar. The vehicle-on-railcar starts a driverless railed ride until reaching a destination site within a campus or city center. After the user gets off the road vehicle, the vehicle-on-railcar continues unmanned to an off-campus parking lot, waiting for a call from the user. Either at a parking spot or at a dedicated charging station, the autonomous road vehicle may be electrically charged automatically.

Optionally, instead of paying for parking, the vehicle-on-railcar may offer driverless paid taxi services within the campus and possibly extended to a railed range off the campus, as long as it can return, properly charged and on time, to pick up its owner from the campus and drive her back home via a railed/road trip.

In some scenarios or for some users, the initial ride to the campus or city center may be performed conventionally on road by the autonomous road vehicle, and transform to a vehicle-on-railcar driverless ride upon approaching the campus or city. The driver is then dropped-off at her in-campus/city destination, and the vehicle-on-railcar then continues its driverless railed trip toward off-campus parking or serving as a driverless paid taxi as described above.

Conclusion

The present disclosure teaches transporting autonomous road vehicles by railcars that are electrically powered by the main power sources—rechargeable batteries or fuel cells—of the carried road vehicles, and are controlled by the transported autonomous transported vehicles.

This paradigm enables:

A. Highly simplifying and reducing the costs of railcars, by eliminating onboard power sources and driving automation control systems for the railcars.

B. Highly simplifying infrastructures and reducing their costs and daily service. For example, railcars require just plain light-duty rails, with no need for a fail-safe heavy-duty electricity supply system which is extremely expensive to acquire, install, service, and operate.

C. Eliminating major additional peak-hour loads on the grid, which could be required for operating a new fleet of railcars powered from the grid.

D. Effectively enabling safe driverless travel.

Advantage A-D accumulate into enabling a new, practical breed of autonomous vehicles, as well as other new transportation instruments implemented as autonomous road vehicles transported by railcars that are powered and controlled by the carried vehicles.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. An autonomous road vehicle operable for both automated road travel and automated railed travel, during automated railed travel the autonomous road vehicle is mounted on and transported by a railcar on a railway, the autonomous road vehicle comprising:
   a vehicle motor;
   a main power source operable to:
      during automated road travel, electrically power the vehicle motor, and
      during automated railed travel, electrically power a railcar motor of the railcar;
   a vehicle power delivery connection operable to, during automated railed travel, deliver electric power from the autonomous road vehicle to the railcar to electrically power the railcar motor; and
   a driving automation control system operable to:
      during automated road travel, autonomously control at least braking of the autonomous road vehicle, and
      during automated railed travel, autonomously control at least braking of the railcar.

2. The autonomous road vehicle of claim 1, further comprising a vehicle inverter, and wherein, during automated railed travel:
   the electric power delivered from the autonomous road vehicle to the railcar via said vehicle power delivery connection is variable frequency AC power supplied from the vehicle inverter to a railcar AC motor of the railcar; and
   the railcar is controlled by said driving automation control system varying the variable frequency of said AC power.

3. The autonomous road vehicle of claim 1, wherein:
   the main power source is a rechargeable battery pack; and
   the vehicle power delivery connection is further operable to momentarily deliver electric power from a railcar AC motor of the railcar to the autonomous road vehicle, to charge the rechargeable battery pack upon regenerative braking of the railcar.

4. The autonomous road vehicle of claim 1, further comprising a driver control that allows a human driver:
   during automated road travel, to override the driving automation control system and manually apply emergency vehicle braking; and
   during automated railed travel, to override the driving automation control system and manually apply emergency railcar braking.

5. The autonomous road vehicle of claim 1, wherein the driving automation control system is operable, toward automated railed travel, to verify that a sufficient amount of electric power is allocated for powering the railcar up to reaching a destination, as a precondition for said railcar transporting the autonomous road vehicle.

6. The autonomous road vehicle claim 1, wherein the driving automation control system is further operable to control operation of a track switching control unit of the railcar.

7. A method for operating an autonomous road vehicle for automated travel of at least one road segment and at least one rail segment, the method comprising:
   for automated travel of a road segment:
      electrically powering a vehicle motor of the autonomous road vehicle, and
      autonomously controlling, by a driving automation control system of the autonomous road vehicle, at least braking of the autonomous road vehicle; and
   for automated travel of a rail segment:
      mounting the autonomous road vehicle on a railcar,
      delivering electric power from the autonomous road vehicle to the railcar to power a railcar motor of the railcar, and
      autonomously controlling, by the driving automation control system of the autonomous road vehicle, at least braking of the railcar.

8. The method of claim 7, wherein the autonomous road vehicle comprises a driver control, the method further comprising:
   during automated road travel, monitoring the driver control for conditionally overriding the driving automation control system and applying manual emergency vehicle braking; and
   during automated railed travel, monitoring the driver control for conditionally overriding the driving automation control system and applying manual emergency railcar braking.

9. The method of claim 7, further comprising, toward traveling an automated rail segment: verifying in advance that a sufficient amount of electric power is allocated for powering the railcar through the automated rail segment, as a precondition for traveling said automated rail segment.

10. A system for automated road travel and automated railed travel of autonomous road vehicles, the system comprising:
    a railcar operable to transport an autonomous road vehicle on a railway, the railcar comprising:
       a deck operable to support an autonomous road vehicle while mounted on the railcar for automated railed travel,
       a railcar motor,
       a railcar power delivery connection operable to deliver electric power from an autonomous road vehicle mounted on the railcar to power the railcar motor, and
       railcar friction brakes; and
    an autonomous road vehicle comprising:
       a vehicle motor,
       a main power source operable to: (i) during automated road travel, electrically power the vehicle motor, and (ii) during automated railed travel, electrically power the railcar motor,
       a vehicle power delivery connection operable to, during automated railed travel, deliver electric power from the autonomous road vehicle to the railcar to electrically power the railcar motor, and
       a driving automation control system operable to: (i) during automated road travel, autonomously control at least braking of the autonomous road vehicle, and (ii) during automated railed travel, autonomously control at least braking of the railcar.

11. The system of claim 10, wherein:
    the autonomous road vehicle further comprises a vehicle inverter that supplies variable frequency AC power;
    the electric power delivered from the autonomous road vehicle to the railcar via the vehicle power delivery connection is the variable frequency AC power;
    the railcar motor is a railcar AC motor powered by the variable frequency AC power; and
    during automated railed travel, the driving automation control system controls the railcar by varying the variable frequency of the AC power supplied by the vehicle inverter.

12. The system of claim 10, wherein:

the main power source is a rechargeable battery pack;

a railcar AC motor of the railcar is operable to apply regenerative braking; and the vehicle power delivery connection is further operable to momentarily charge the rechargeable battery pack upon the regenerative braking.

13. The system of claim 10, wherein the autonomous road vehicle comprises a driver control that allows a human driver:

during automated road travel, to override the driving automation control system and manually apply emergency vehicle braking; and during automated railed travel, to override the driving automation control system and manually apply emergency railcar braking.

14. The system of claim 10, wherein the driving automation control system of the autonomous road vehicle is operable to verify in advance that a sufficient amount of electric power is allocated for powering the railcar up to reaching a designated destination, as a precondition for said railcar transporting the autonomous road vehicle to the designated destination.

15. The system of claim 10, wherein:

the railcar further comprising a track switching control unit; and the driving automation control system is further operable to control operation of the track switching control unit.

16. The system of claim 10 automated operation, wherein:

the autonomous road vehicle is mounted on the railcar and is in automated railed travel;

the railcar motor is powered by the main power source of the autonomous road vehicle; and braking is operating under control of the driving automation control system.

17. A railcar transporting an autonomous road vehicle on a railway, the railcar comprising:

a deck supporting the autonomous road vehicle;

a railcar AC motor; and a railcar power delivery connection delivering variable frequency AC power from a vehicle inverter of the autonomous road vehicle to power the railcar AC motor, or momentarily delivering electric power to the autonomous road vehicle upon regenerative braking.

18. The railcar of claim 17, further comprising railcar friction brakes that are controlled by the autonomous road vehicle.

* * * * *